US011567876B2

(12) United States Patent
Bora et al.

(10) Patent No.: US 11,567,876 B2
(45) Date of Patent: Jan. 31, 2023

(54) RESOLVING CACHE SLOT LOCKING CONFLICTS FOR REMOTE REPLICATION

(71) Applicant: EMC IP Holding Company LLC, Hopkinton, MA (US)

(72) Inventors: Bhaskar Bora, Shrewsbury, MA (US); Benjamin Yoder, Chandler, AZ (US)

(73) Assignee: EMC IP Holding Company LLC, Hopkinton, MA (US)

( * ) Notice: Subject to any disclaimer, the term of this patent is extended or adjusted under 35 U.S.C. 154(b) by 61 days.

(21) Appl. No.: 17/084,835

(22) Filed: Oct. 30, 2020

(65) Prior Publication Data

US 2022/0138105 A1    May 5, 2022

(51) Int. Cl.
*G06F 12/0871* (2016.01)
*G06F 12/02* (2006.01)
*G06F 12/0813* (2016.01)
*G06F 12/0817* (2016.01)

(52) U.S. Cl.
CPC ...... *G06F 12/0871* (2013.01); *G06F 12/0238* (2013.01); *G06F 12/0813* (2013.01); *G06F 12/0822* (2013.01)

(58) Field of Classification Search
CPC ............ G06F 12/0238; G06F 12/0813; G06F 12/0822; G06F 12/0871
See application file for complete search history.

(56) References Cited

U.S. PATENT DOCUMENTS

| 5,544,347 | A | 8/1996 | Yanai et al. | |
|---|---|---|---|---|
| 5,742,792 | A | 4/1998 | Yanai et al. | |
| 6,785,714 | B1* | 8/2004 | Thompson | G06F 16/9574 711/216 |
| 7,051,176 | B2* | 5/2006 | Meiri | G06F 12/0871 711/111 |
| 7,054,883 | B2 | 5/2006 | Meiri et al. | |
| 8,862,541 | B1* | 10/2014 | Cox | G06F 16/2386 707/613 |
| 9,933,947 | B1* | 4/2018 | Vokaliga | G06F 12/0802 |
| 2008/0104334 | A1* | 5/2008 | Bellaton | G06F 12/0842 711/141 |

\* cited by examiner

*Primary Examiner* — Aracelis Ruiz
(74) *Attorney, Agent, or Firm* — Muirhead and Saturnelli, LLC

(57) ABSTRACT

Cache slots on a storage system may be shared between entities processing write operations for logical storage unit (LSU) tracks and entities performing remote replication for write operations for the LSU tracks. If a new write operation is received on a first storage system (S1) for a track of an LSU (R1) when the cache slot mapped to the R1 track is locked by a process currently transmitting data of the cache slot to a second storage system (S2), a new cache slot may be allocated to the R1 track, the data of the original cache slot copied to the new cache slot, and the new write operation for the R1 track initiated on S1 using the new cache slot; while the data of the original cache slot is independently, and perhaps concurrently, transmitted to S2 to be replicated in R2, the LSU on S2 that is paired with R1.

20 Claims, 11 Drawing Sheets

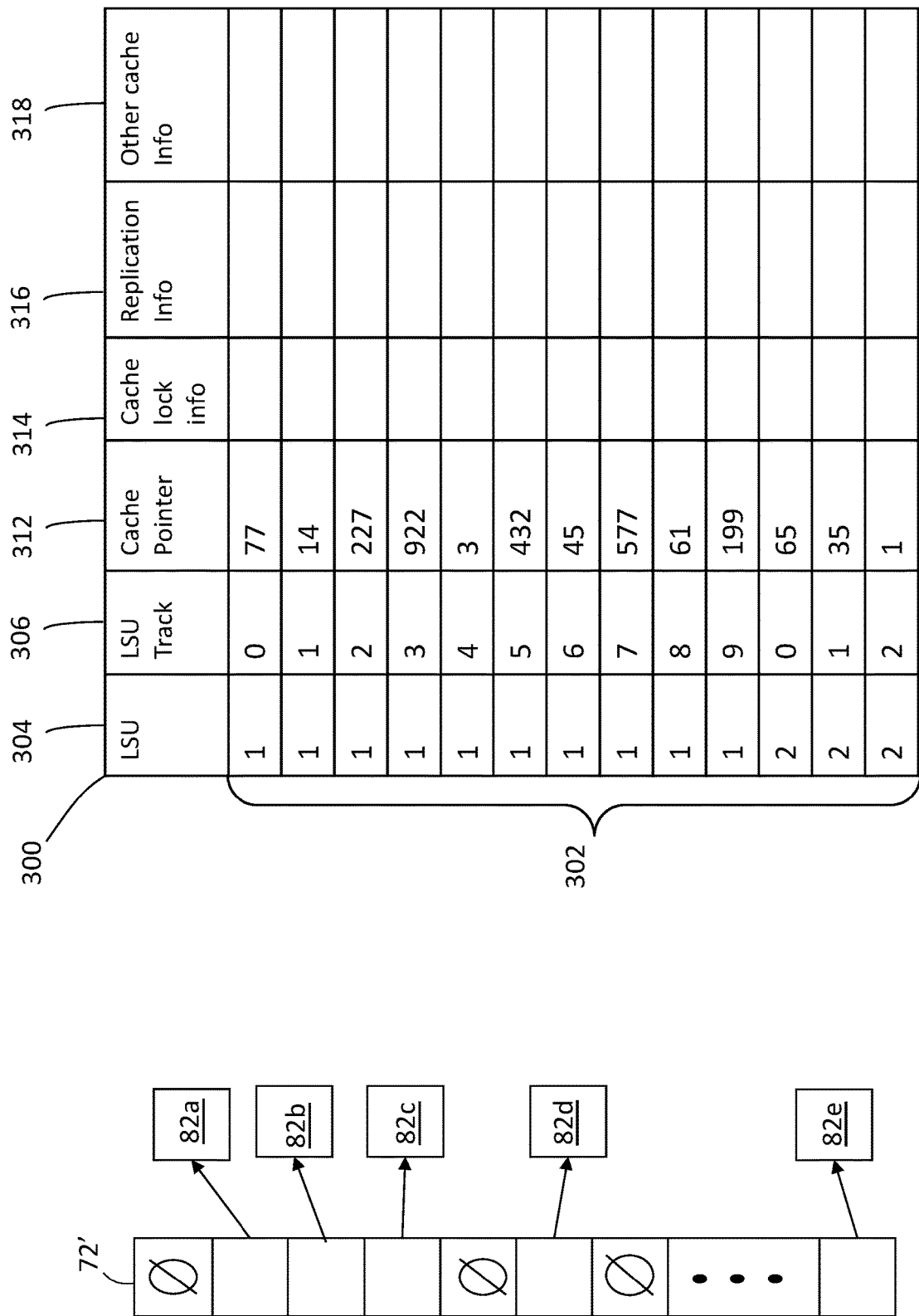

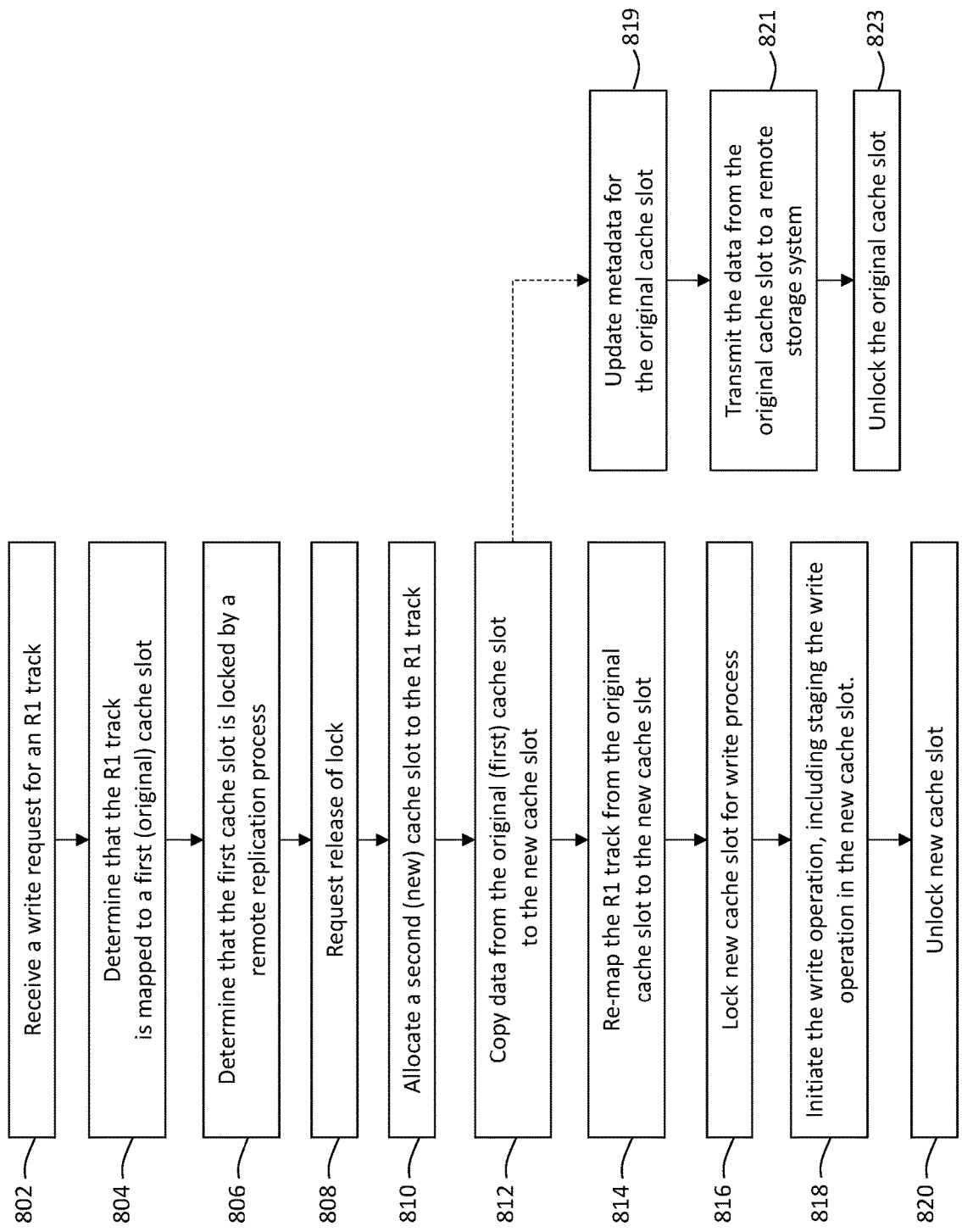

RESOLVING CACHE SLOT LOCKING CONFLICTS FOR REMOTE REPLICATION

BACKGROUND

Technical Field

This application generally relates to data storage networks, and more particularly to resolving cache slot locking conflicts between front-end adapters and remote adapters on a storage system.

Description of Related Art

Data storage systems (often referred to herein simply as "storage systems") may include storage resources used by one or more host systems (sometimes referred to herein as "hosts"), i.e., servers, to store data. One or more storage systems and one or more host systems may be interconnected by one or more network components, for example, as part of a switching fabric, to form a data storage network (often referred to herein simply as "storage network"). Storage systems may provide a variety of data services to host systems of the storage network.

A host system may have host applications that utilize the data services provided by one or more storage systems of the storage network to store data on the physical storage devices (e.g., tape, disks or solid state devices) thereof. For a given application, to perform input/output (I/O) operations utilizing a physical storage device of the storage system, one or more components of the host system, storage system and network components therebetween may be used. The one or more combinations of components of the host, switching fabric and storage system over which I/O operations between an application and the storage system may be communicated may be considered an I/O path between the application and the storage system. It should be appreciated that other combinations of components of a storage network, for example, two or more storage systems, also may be coupled together by one or more switches of a switching fabric. Thus, more generically, the one or more combinations of components of a first network component, switching fabric and second network component over which I/O communications may be communicated may be considered an I/O path between the two network components. The collective I/O paths between components of a storage network may be considered to define a connectivity of the storage network.

Host systems may not address the physical storage devices of a storage systems directly, but rather access to data may be provided to one or more host systems from what the host system(s) view as a plurality of logical storage units (LSUs) including, for example, logical blocks, logical devices (also referred to as logical volumes, LUNs and logical disks), thin devices, groups of logical devices (e.g., storage groups), NVMe namespaces, and other types of LSUs. LSUs are described in more detail elsewhere herein.

SUMMARY OF THE INVENTION

In some embodiments of the invention, a method is performed for a data storage system including a cache including a plurality of cache slots. The methods incudes: in response to receiving a write request that specifies first data and a write operation for a first portion of a logical storage unit, determining that the first portion is mapped to a first cache slot of the plurality of cache slots; determining that the first cache slot is locked by a remote replication process executing on the storage system; allocating a second cache slot to the first portion; copying second data from the first cache slot to the second cache slot; and re-mapping the first portion from the first cache slot to the second cache slot. The method further may include performing the write operation, including staging the data in the second cache slot. The method further may include, after staging the second data in the second cache slot, unlocking the second cache slot. The method further may include transmitting the second data from the first cache slot to a remote storage system. The remote replication process may execute asynchronous replication. A first data structure may have a plurality of entries, each entry representing a portion of the logical storage unit, including a first entry representing the first portion, and re-mapping the first portion may include modifying the first entry from pointing to the first cache slot to pointing to the second cache slot. The replication process may maintain a plurality of cycles, each cycle corresponding to a respective period of time and may include a queue of cache slots. A first cycle of the plurality of replication cycles may correspond to a first period of time is in a capture phase during which data stored in cache slots in the queue of the cache slots of the first cycle are replicated from the storage system to a remote storage system. A second cycle of the plurality of replication cycles may correspond to a second period of time, after the first period, during which the write request is received is in a capture phase during which a queue of cache slots of the second cycle are being populated with cache slots mapped to logical storage unit portions for which write operations were initiated during the second period, and the first cache slot may be in the first cycle and the second cache slot may be in the second cycle.

In other embodiments of the invention, a data storage system includes a cache including a plurality of cache slots and executable logic that implements a method including: in response to receiving a write request that specifies first data and a write operation for a first portion of a logical storage unit, determining that the first portion is mapped to a first cache slot of the plurality of cache slots; determining that the first cache slot is locked by a remote replication process executing on the storage system; allocating a second cache slot to the first portion; copying second data from the first cache slot to the second cache slot; and re-mapping the first portion from the first cache slot to the second cache slot. The method further may include performing the write operation, including staging the data in the second cache slot. The method further may include, after staging the second data in the second cache slot, unlocking the second cache slot. The method further may include transmitting the second data from the first cache slot to a remote storage system. The remote replication process may execute asynchronous replication. A first data structure may have a plurality of entries, each entry representing a portion of the logical storage unit, including a first entry representing the first portion, and re-mapping the first portion may include modifying the first entry from pointing to the first cache slot to pointing to the second cache slot. The replication process may maintain a plurality of cycles, each cycle corresponding to a respective period of time and may include a queue of cache slots, and a first cycle of the plurality of replication cycles may correspond to a first period of time is in a capture phase during which data stored in cache slots in the queue of the cache slots of the first cycle are replicated from the storage system to a remote storage system, and a second cycle of the plurality of replication cycles may correspond to a second period of time, after the first period, during which the write request is received is in a capture phase during which a queue of cache slots of the second cycle are being populated with cache slots mapped to logical storage unit portions for which write operations were initiated during the second period, and the first cache slot may be in the first cycle and the second cache slot may be in in the second cycle.

In other embodiments of the invention, computer-readable media may be provided for a data storage system including a cache including a plurality of cache slots. The computer-readable media having software stored thereon, the software including: executable code that, in response to receiving a write request that specifies first data and a write operation for a first portion of a logical storage unit, determines that the first portion is mapped to a first cache slot of the plurality of cache slots; executable code that determines that the first cache slot is locked by a remote replication process executing on the storage system; executable code that allocates a second cache slot to the first portion; executable code that copies second data from the first cache slot to the second cache slot; and executable code that re-maps the first portion from the first cache slot to the second cache slot. The computer-readable media further may include executable code that performs the write operation, including staging the data in the second cache slot. The computer-readable media further may include executable code that transmits the second data from the first cache slot to a remote storage system. The remote replication process may execute asynchronous replication. A first data structure may have a plurality of entries, each entry representing a portion of the logical storage unit, including a first entry representing the first portion, and re-mapping the first portion may include executable code that modifies the first entry from pointing to the first cache slot to pointing to the second cache slot. The replication process may maintain a plurality of cycles, each cycle corresponding to a respective period of time and may include a queue of cache slots, and a first cycle of the plurality of replication cycles may correspond to a first period of time is in a capture phase during which data stored in cache slots in the queue of the cache slots of the first cycle are replicated from the storage system to a remote storage system, and a second cycle of the plurality of replication cycles may correspond to a second period of time, after the first period, during which the write request is received is in a capture phase during which a queue of cache slots of the second cycle are being populated with cache slots mapped to logical storage unit portions for which write operations were initiated during the second period, and the first cache slot may be in the first cycle and the second cache slot may be in the second cycle.

BRIEF DESCRIPTION OF THE DRAWINGS

Features and advantages of the present invention will become more apparent from the following detailed description of illustrative embodiments thereof taken in conjunction with the accompanying drawings in which:

FIG. 4 a block diagram illustrating an example of a table used for a thin logical device, according to embodiments of the invention;

FIG. 5 is a block diagram illustrating an example of a data structure for mapping logical storage unit tracks to cache slots, according to embodiments of the invention;

FIG. 8 is a flowchart illustrating an example of a method of resolving a cache slot locking conflict, according to embodiments of the invention.

DETAILED DESCRIPTION OF EMBODIMENTS

Figure 1:
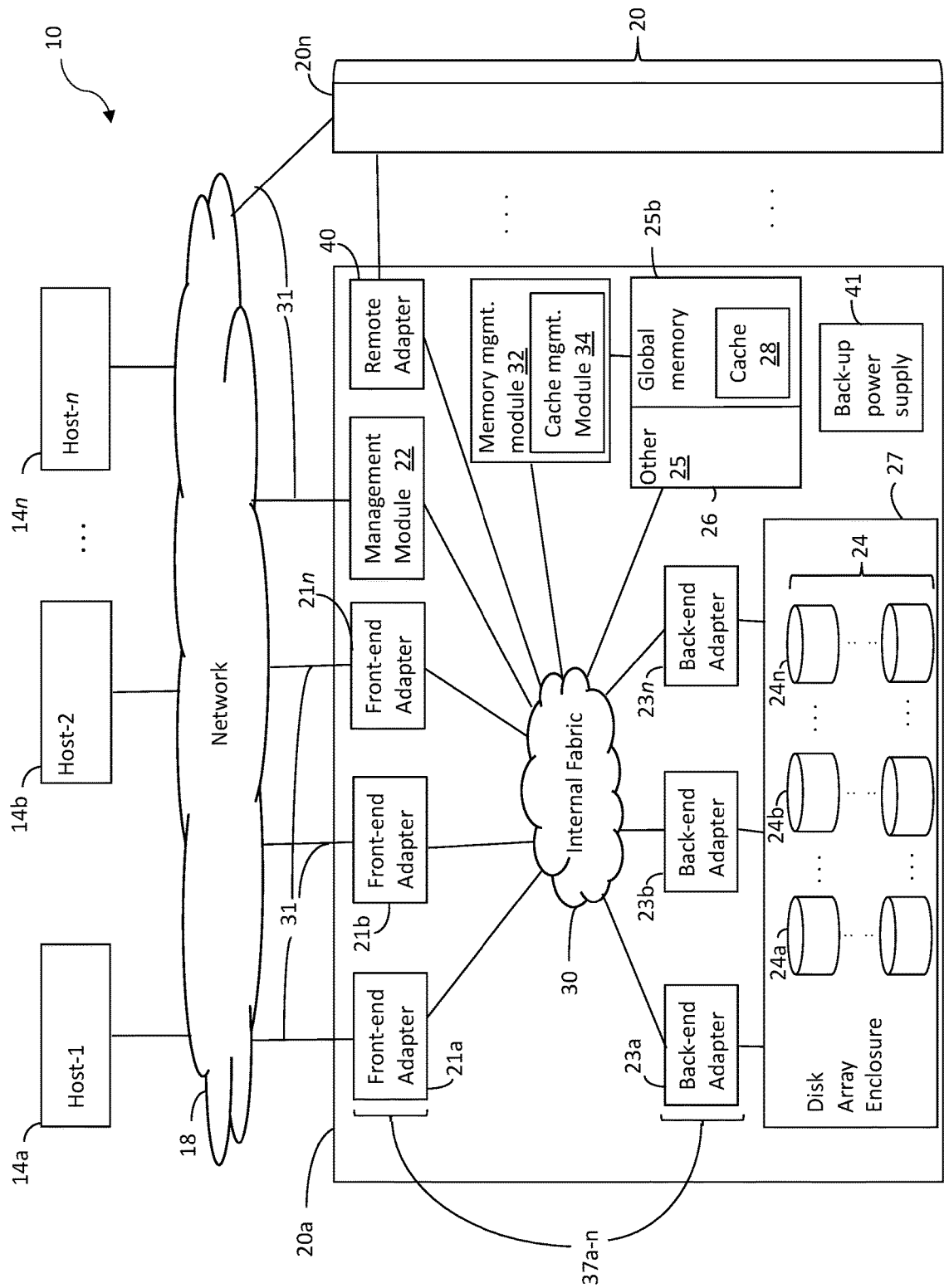
FIG. 1 is a block diagram illustrating an example of a data storage network, according to embodiments of the invention.

On some storage systems, write operations received from a host system are initially staged temporarily in cache (e.g., in a memory of the storage system) before ultimately being de-staged and stored on a physical storage device (PSD) of the storage system.

Some storage systems also may be configured for asynchronous remote replication (ARR), which is described in more detail elsewhere herein. ARR includes establishing an asynchronous replication relationship between an LSU (e.g., LUN or logical device) on a first storage system, and an LSU on a second storage system. The first storage system in this relationship may be referred to herein as "S1" and the LSU on S1 may be referred to herein as the "R1 LSU" or simply "R1." The second storage system in this relationship may be referred to herein as "S2" and the LSU on S2 may be referred to herein as the "R2 LSU" or simply "R2." ARR includes replicating updates to data resulting from write operations received on S1 for R1 to R2 on S2 by transmitting a copy of the updated data from R1 on S1 to R2 on S1. The replication of ARR is asynchronous in that S1 sends an acknowledgement to a host for a write operation as soon as S1 has committed the write operation without waiting for an acknowledgement from S2 that S2 has committed the write operation, whereas for synchronous replication S1 would not send an acknowledgement to the host for a write operation until S1 received an acknowledgement that S2 has committed the write operation.

ARR may include a plurality of replication cycles ("cycles") for R1, each cycle corresponding to a period of time and specifying tracks of R1 for which data was updated (e.g., by a write operation) during the period of time represented by the cycle. Each cycle may transition through four phases—two phases on S1 and two phases on S2. The two phases on S1 may include a capture phase during which the data updates for R1 are captured or collected, after which the cycle transitions into a transfer phase during which the updated data for R1 is transmitted from S1 to S2 to be updated for R2. On S2, the cycle begins in a receive phase during which the data updates transmitted as part of the transfer phase on S1 are received on S2, and transitions to an apply phase during which the data updates are applied to R2.

If S1 is a storage system in which write operations are initially staged in a cache slot, an R1 track that was updated during a cycle may be specified by specifying the cache slot mapped to the R1 track at the time the write operation was initiated (and thus staged to the cache slot). A cycle queue may be maintained on S1 for each cycle, where each queue entry specifies a cache slot mapped to an R1 track that was updated during the period of time represented by the cycle.

For the data of a cache slot that was updated during the capture phase of a cycle, transmitting the data from S1 to S2 during a transfer phase may include: allocating another cache slot, copying the data of the cache (the "original cache slot") to the newly allocated cache slot (the "new cache slot"), and transmitting the data from the new cache slot from S1 to S2. However, allocating another cache slot for every cache slot of a cycle that is in a transfer phase may consume a significant amount of cache resources, and, more generally, memory resources, on S1. In some embodiments, to reserve cache resources on S1, rather than allocate a new cache slot for the transfer phase, the same original cache slot is used. That is, rather than allocating a new cache slot to handle the transmission of the cache slot data from S1 to S2, the entity executing the transfer phase (e.g., a remote adapter (RA) as described in more detail elsewhere herein) may simply use the same cache slot to which the R1 track is mapped, which is also accessible by other processes on S1, for example, front-end adapters (FAs, described in more detail herein) that process I/O requests received from hosts.

For a given cache slot shared by: one or more FAs processing I/O requests (including write operations) for an R1 track from host systems on one hand, and one or more RAs transmitting data updates for the R1 track to S2 during a transfer phase on another hand, cache slot locking conflicts may arise. For example, when the time comes to transmit the data of the shared cache slot to S2, the RA obtains a lock of (i.e., "locks") the cache slot so that the contents of the cache slot cannot be altered by any other process, for example, any front-end adapter (FA) executing a write operation received from a host system for the R1 track. The lock may be held until the transmission of the cache slot data from S1 to S2 is complete, e.g., until an acknowledgement is received from S2 that the cache slot data has been committed on S2. While the lock is held, no write operations for the R1 track can be staged to the cache slot, resulting in delay. If there is a lot of traffic between S1 and S2 or a physical or logical problem (e.g., failure) of any component involved in the transmission of the data from S1 to S2, then the delay resulting from the cache slot lock may cause unacceptably long response times and may lead to more systemic performance issues on S1.

What may be desired is a way to share cache slots between entities (e.g., FAs) processing write operations for R1 tracks and entities (e.g., RAs) performing remote replication for the R1 tracks without cache slot locks causing unacceptable delays of write operations on the storage system.

Described herein are techniques and mechanisms for sharing cache slots between entities (e.g., FAs) processing write operations (e.g., from hosts) for R1 tracks and entities (e.g., RAs) performing remote replication for the R1 tracks while reducing delays that may be caused by locking cache slots in known systems. In some embodiments of the invention, if a new write operation is received on S1 for an R1 track while the cache slot mapped to the R1 track is currently locked by a process transmitting the data of the cache slot to R2 (e.g., during the transfer phase of a previous cycle of R1), a new cache slot may be allocated to the LSU track, the cache slot data copied from the original cache slot to the new cache slot, and the new write operation initiated on S1 using the new cache slot; while the cache slot data is independently copied from the original cache slot to S2. That is, a new cache slot may be allocated to an R1 track on demand—i.e., in response to receiving a write request specifying a write operation for the R1 track—to enable an initiating of the write operation on R1 concurrently to the continued processing of remote replication of a previous write operation (i.e., during a previous cycle) for the R1 track from S1 to S2. The response time for the newly received write operation may be reduced, perhaps significantly, from what the response time would be if the cache slot remained lock and the write operation could not be initiated on S1 until the transmission of the cache slot data to S2 were completed and acknowledged.

Some embodiments of the invention described herein are described as being implemented by an FA and/or an RA. However, it should be appreciated that the invention is not so limited, and other entities may implement such embodiments and are intended to be included within the scope of the invention.

Illustrative embodiments of the invention will now be described in more detail in relation to the figures.

FIG. 1 illustrates an example of an embodiment of a data storage network 10 (often referred to herein as a "storage network"). The storage network 10 may include any of: host systems (i.e., "hosts") 14a-n; network 18; one or more storage systems 20a-n; other components; or any suitable combination of the foregoing. Storage systems 20a-n, connected to host systems 14a-n through network 18, may collectively constitute a distributed storage system 20. All of the host computers 14a-n and storage systems 20a-n may be located at the same physical site, or, alternatively, two or more host computers 14a-n and/or storage systems 20a-n may be located at different physical locations. Storage network 10 or portions thereof (e.g., one or more storage systems 20a-n in combination with network 18) may be any of a variety of types of storage networks, such as, for example, a storage area network (SAN), e.g., of a data center. Embodiments of the invention are described herein in reference to storage system 20a, but it should be appreciated that such embodiments may be implemented using other discrete storage systems (e.g., storage system 20n), alone or in combination with storage system 20a.

The N hosts 14a-n may access the storage system 20a, for example, in performing input/output (I/O) operations or data requests, through network 18. For example, each of hosts 14a-n may include one or more host bus adapters (HBAs) (not shown) that each include one or more host ports for connecting to network 18. The network 18 may include any one or more of a variety of communication media, switches and other components known to those skilled in the art, including, for example: a repeater, a multiplexer or even a satellite. Each communication medium may be any of a variety of communication media including, but not limited to: a bus, an optical fiber, a wire and/or other type of data link, known in the art. The network 18 may include at least a portion of the Internet, or a proprietary intranet, and components of the network 18 or components connected thereto may be configured to communicate in accordance with any of a plurality of technologies, including, for example: SCSI, ESCON, Fibre Channel (FC), iSCSI, FCoE, GIGE (Gigabit Ethernet), NVMe over Fabric (NVMeoF); other technologies, or any suitable combinations of the foregoing, each of which may have one or more associated standard specifications. In some embodiments, the network 18 may be, or include, a switching fabric including one or more switches and other components. A network located externally to a storage system that connects host systems to storage system resources of the storage system, may be referred to herein as an "external network."

Each of the host systems 14a-n and the storage systems 20a-n included in the storage network 10 may be connected to the network 18 by any one of a variety of connections as may be provided and supported in accordance with the type of network 18. The processors included in the host computer systems 14a-n may be any one of a variety of proprietary or commercially available single or multi-processor system, such as an Intel-based processor, or other type of commercially available processor able to support traffic in accordance with each particular embodiment and application. Each of the host computer systems may perform different types of I/O operations in accordance with different tasks and applications executing on the hosts. In the embodiment of FIG. 1, any one of the host computers 14a-n may issue an I/O request to the storage system 20a to perform an I/O operation. For example, an application executing on one of the host computers 14a-n may perform a read or write operation resulting in one or more I/O requests being transmitted to the storage system 20a.

Each of the storage systems 20a-n may be manufactured by different vendors and interconnected (not shown). Additionally, the storage systems 20a-n also may be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by each of the host computer systems 14a-n, for example, to the storage systems 20a-20n. It should be appreciated that the particulars of the hardware and software included in each of the components that may be included in the storage systems 20a-n are described herein in more detail, and may vary with each particular embodiment.

Each of the storage systems, such as 20a, may include a plurality of physical storage devices 24 (e.g., physical non-volatile storage devices) such as, for example, disk devices, solid-state storage devices (SSDs, e.g., flash, storage class memory (SCM), NVMe SSD, NVMe SCM) or even magnetic tape, and may be enclosed within a disk array enclosure (DAE) 27. In some embodiments, two or more of the physical storage devices 24 may be grouped or arranged together, for example, in an arrangement consisting of N rows of physical storage devices 24a-n. In some embodiments, one or more physical storage devices (e.g., one of the rows 24a-n of physical storage devices) may be connected to a back-end adapter ("BE") (e.g., a director configured to serve as a BE) responsible for the backend management of operations to and from a portion of the physical storage devices 24. A BE is sometimes referred to by those in the art as a disk adapter ("DA") because of the development of such adapters during a period in which disks were the dominant type of physical storage device used in storage systems, even though such so-called DAs may be configured to manage other types of physical storage devices (e.g., SSDs). In the system 20a, a single BE, such as 23a, may be responsible for the management of one or more (e.g., a row) of physical storage devices, such as row 24a. That is, in some configurations, all I/O communications with one or more physical storage devices 24 may be controlled by a specific BE. BEs 23a-n may employ one or more technologies in communicating with, and transferring data to/from, physical storage devices 24, for example, SAS, SATA or NVMe. For NVMe, to enable communication between each BE and the physical storage devices that it controls, the storage system may include a PCIe switch for each physical storage device controlled by the BE; i.e., connecting the physical storage device to the controlling BE.

It should be appreciated that the physical storage devices are not limited to being arranged in rows. Further, the DAE 27 is not limited to enclosing disks, as the name may suggest, but may be constructed and arranged to enclose a plurality of any type of physical storage device, including any of those described herein, or combinations thereof.

The system 20a also may include one or more front-end adapters ("FAs") 21a-n (e.g., directors configured to serve as FAs), which also are referred to herein as host adapters ("Hs"). Each of these FAs may be used to manage communications and data operations between one or more host systems and global memory (GM) 25b of memory 26. The FA may be, or include, a Fibre Channel (FC) adapter if FC is a technology being used to communicate between the storage system 20a and the one or more host systems 14a-n, or may be another type of adapter based on the one or more technologies being used for I/O communications.

Also shown in the storage system 20a is a remote adapter ("RA") 40. The RA may be, or include, hardware that includes a processor used to facilitate communication between storage systems (e.g., 20a and 20n), such as between two of the same or different types of storage systems, and/or may be implemented using a director.

Storage system 20a also may include a management module 22, which may be configured (e.g., dedicated) to performing storage management functions or services such as, for example, storage provisioning, device configuration, tier management, other services, or any combination of other services. The management module may be configured to be accessed by only certain personnel (e.g., storage administrators, support engineers) and may have its own dedicated hardware, firmware, software, CPU resources and OS, and may be loaded with one or more applications, tools, CLIs, APIs and the like to enable management. In some embodiments, the management module, or portions thereof, may be located external to storage system 20a, for example, as part of one of host systems 14a-n or another separate system connected to storage system 20a via network 18.

The FAs, BEs and RA may be collectively referred to herein as directors 37a-n. Each director 37a-n may be implemented (e.g., in hardware, firmware, software or a combination thereof) on a circuit board that includes memory resources (e.g., at least a segment of GM portion 25b) and compute resources, for example, one or more processing cores (e.g., as part of a CPU) and/or a CPU complex for processing I/O operations, and that as described in more detail elsewhere herein. There may be any number of directors 37a-n, which may be limited based on any of a number of factors, including spatial, computation and storage limitations. In an embodiment disclosed herein, there may be up to sixteen directors coupled to the memory 26. Other embodiments may use a higher or lower maximum number of directors.

System 20a also may include an internal switching fabric (i.e., internal fabric) 30, which may include one or more switches, that enables internal communications between components of the storage system 20a, for example, directors 37a-n (FAs 21a-n, BEs 23a-n, RA 40, management module 22) and memory 26, e.g., to perform I/O operations. One or more internal logical communication paths may exist between the directors and the memory 26, for example, over the internal fabric 30. For example, any of the directors 37a-n may use the internal fabric 30 to communicate with other directors to access any of physical storage devices 24;

i.e., without having to use memory 26. In addition, one of the directors 37a-n may be able to broadcast a message to all of the other directors 37a-n over the internal fabric 30 at the same time. Each of the components of system 20a may be configured to communicate over internal fabric 30 in accordance with one or more technologies such as, for example, InfiniBand (TB), Ethernet, Gen-Z, another technology, or any suitable combination of the foregoing.

The GM portion 25b may be used to facilitate data transfers and other communications between the directors 37a-n in a storage system. In one embodiment, the directors 37a-n (e.g., serving as FAs or BEs) may perform data operations using a cache 28 that may be included in the GM 25b, for example, in communications with other directors, and other components of the system 20a. The other portion 25a is that portion of memory that may be used in connection with other designations that may vary in accordance with each embodiment. Global memory 25b and cache 28 are described in more detail elsewhere herein. It should be appreciated that, although memory 26 is illustrated in FIG. 1 as being a single, discrete component of storage system 20a, the invention is not so limited. In some embodiments, memory 26, or the GM 25b or other memory 25a thereof, may be distributed among a plurality of physically discrete processing nodes (e.g., circuit boards) as described in more detail elsewhere herein.

In at least one embodiment, write data received at the storage system from a host or other client may be initially written to cache 28 and marked as write pending. For example, cache 28 may be partitioned into one or more portions called cache slots (which also may be referred to in the field of data storage as cache lines, cache blocks or another name), which may be a of a predefined uniform size, for example, 128 Kbytes. Write data of a write operation received at the storage system may be initially written (i.e., staged) in one or more of these cache slots and marked as write pending. Once written to cache 28, the host (e.g., one of 14a-n) may be notified that the write operation has completed. At a later time, the write data may be de-staged from cache 28 to one or more physical storage devices 24a-n, such as by a BE.

The memory 26 may include persistent memory for which for which data stored thereon persists after the process or program that created the data terminates. For example, at least portions of the memory 26 may be implemented using DIMM (or another type of fast RAM memory) that is battery-backed by a NAND-type memory (e.g., flash). In some embodiments, the data in such persistent memory may persist (for at least some period of time) after the storage system fails. The memory 26 (or at least a portion thereof—e.g., the cache 28 or a portion thereof) may be configured such that each data written to the memory 28 is mirrored to provide a form of write protection. For example, each memory location within each such mirrored portion of the memory 26 may have a corresponding memory location on the storage system 20a to which a redundant copy of the data is stored, and which can be used in place of the mirrored memory location in the event the mirrored memory location fails. The redundant memory location should be located outside of at least the most local fault zone of the mirrored memory location. In some embodiments described in more detail herein, the memory 26 may be distributed among multiple physically discrete processing nodes (e.g., circuit boards), in which case mirroring may be configured such that a mirrored memory location and its corresponding redundant memory location are located on different physically discrete processing nodes.

Storage system 20a may include a back-up power supply 41 (e.g., a battery) that can provide power to the storage system for a limited amount of time to after primary (AC) power fails. This limited time may allow certain tasks to be performed during a window of time beginning when the primary power fails until the earliest of: the primary power is restored; and the end of the limited lifetime (sometimes on the order of second or tens of seconds) of the back-up power supply. For example, the storage system 20a (e.g., the memory 26 and/or memory management module 32) may be configured to automatically copy the contents of the memory 26 during this window of time to one or more predetermined physical storage devices, to be restored to the memory 26 after the power has been restored, e.g., as part of the storage system recovering process. Such automatic copying for restoration during recovering may referred to herein as "vaulting." Vaulting may provide a form of write protection for data written to the memory 26, for example, for dirty data in the cache 28; i.e., data written to the storage system, which has been staged in the cache 28 but not yet de-staged to a physical storage device. More broadly, vaulting may be performed for any data written to the memory 26.

The storage system 20a may include a memory management module 32 configured to manage one or more aspects of the memory 26, and the memory management module 32 may include a cache management module 34 for managing one or more aspects of the cache 28.

It should be noted that, although examples of techniques herein may be made with respect to a physical storage system and its physical components (e.g., physical hardware for each RA, BE, FA and the like), techniques herein may be performed in a physical storage system including one or more emulated or virtualized components (e.g., emulated or virtualized ports, emulated or virtualized BEs or FAs), and also a virtualized or emulated storage system including virtualized or emulated components. For example, in embodiments in which NVMe technology is used to communicate with, and transfer data between, a host system and one or more FAs, one or more of the FAs may be implemented using NVMe technology as an emulation of an FC adapter.

Figure 2:
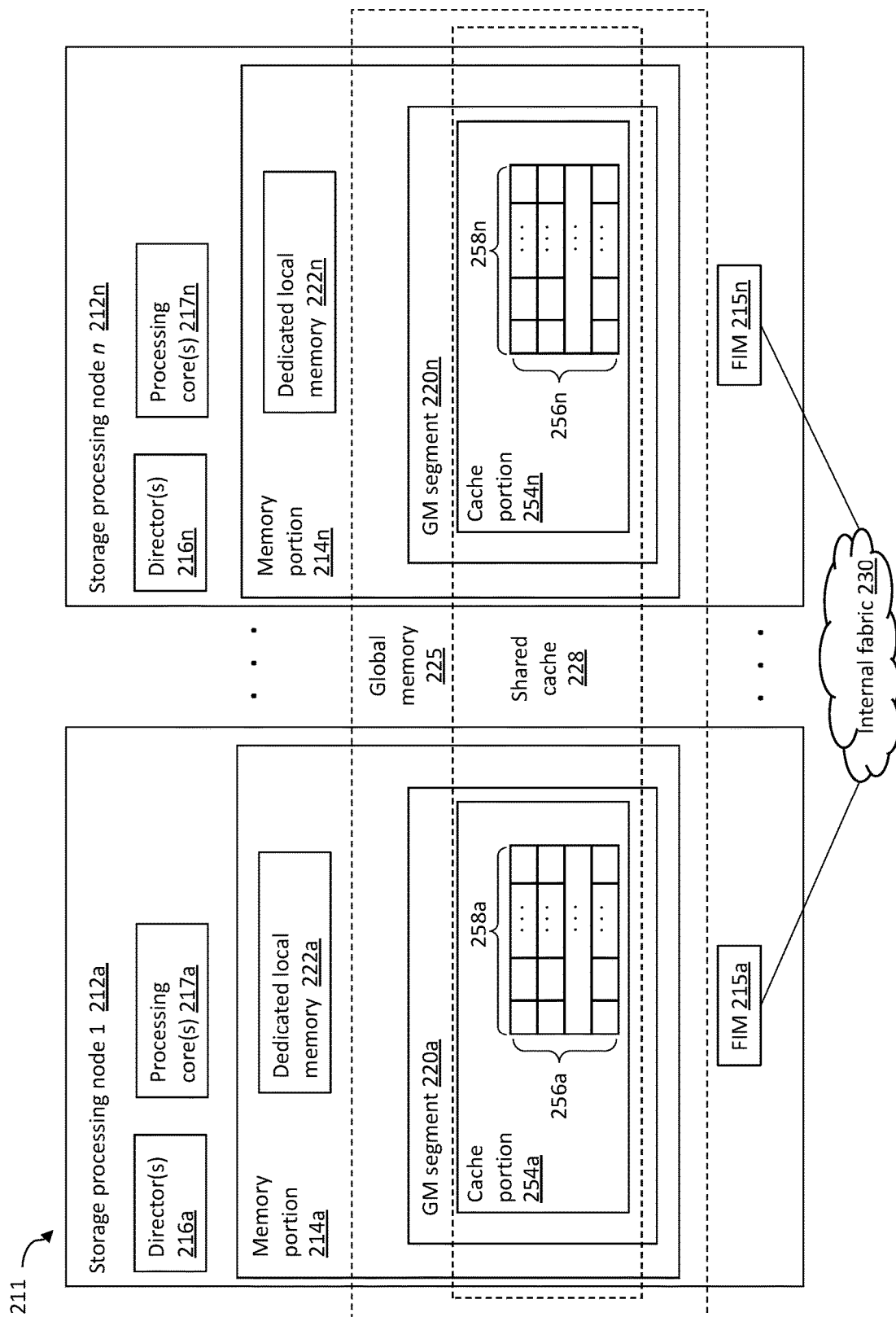
FIG. 2 is a block diagram illustrating an example of a storage system including multiple physically discrete storage processing nodes, according to embodiments of the invention.

Any of storage systems 20a-n, or one or more components thereof, described in relation to FIGS. 1-2 may be implemented using one or more Symmetrix™, VMAX™, VMAX3™ or PowerMax™ systems made available from Dell EMC.

Host systems 14a-n may provide data and control (e.g., management and access control) information to storage systems 20a-n over a plurality of I/O paths defined between the host systems and storage systems, for example, including host system components, storage system components, and network components (e.g., of network 18), and the storage systems also may provide data to the host systems across the I/O paths. In the embodiment of FIG. 1, the host systems may not address the physical storage devices (e.g., disk drives or flash drives) 24 of the storage systems directly, but rather access to data may be provided to one or more host systems from what the host systems view as a plurality of LSUs including, for example, logical blocks, logical devices (also referred to as logical volumes, LUNs, logical storage units and/or logical disks), thin devices, groups of logical devices (e.g., storage groups), NVMe namespaces, and other types of LSUs. For example, a PowerMax storage system may be configured to organize available storage resources (e.g., physical storage devices) into many LUNs, each with its own addressable space defined in logical blocks addresses (LBAs). The LSUs may or may not correspond to the actual physical storage devices. For example, one or more LSUs may map to a single physical storage device; that is, the logical address space of the one or more LSU may map to physical space on a single physical storage device. Data in a single storage system may be accessed by multiple hosts allowing the hosts to share the data residing therein. The FAs may be used in connection with communications between a storage system and a host system. The RAs may be used in facilitating communications between two storage systems. The BEs may be used in connection with facilitating communications to the associated physical storage device(s) based on LSU(s) mapped thereto.

FIG. 2 is a block diagram illustrating an example of at least a portion 211 of a storage system (e.g., 20a) including multiple, physically discrete storage processing nodes (e.g., circuit boards) 212a-212n, which may be referred to herein as "processing nodes." Storage system 211 may include a plurality of processing nodes 212a-212n and a fabric 230 (e.g., internal fabric 30) over which the processing nodes 212a-n may communicate. Each of the processing nodes 212a-212n may include components thereon as illustrated. The switching fabric 230 may include, for example, one or more switches and connections between the switch(es) and processing nodes 212a-212n. In at least one embodiment, the fabric 230 may be an IB fabric. In some embodiments, multiple processing 212a-n nodes may be implemented on a single physically discrete component; e.g., two processing nodes 212a-n may be implemented on single engine of PowerMax storage system.

In the following paragraphs, further details are described with reference to processing node 212a but each of the N processing nodes in a system may be similarly configured. For example, processing node 212a may include any of: one or more directors 216a (e.g., directors 37a-n); memory portion 214a; one or more processing cores 217a including compute resources, for example, as part of a CPUs and/or a CPU complex for processing I/O operations; and a fabric interface module (FIM) 215a for interfacing the processing node 212a to an internal fabric 230. Each director 216a may be configured to operate, such as by executing code, as any one or more of an FA, BE, RA, and the like. In some embodiments, each of the directors, or a portion thereof, are implemented in software stored in a memory portion 214a (e.g., in a dedicated local memory 222a) that is executed by one or more of the processing cores 217a. Such software implementation of directors may be considered emulations of types of physical directors (i.e., directors implemented (at least primarily) in hardware).

Each FIM 215a-n may include one or more host channel adapters (HCAs) that physically couple, and are configured to enable communication between, its respective processing node 212a-n, and the internal fabric 230. In some embodiments, the internal fabric 230 may include multiple (e.g., 2) switches, and each HCA 215a-n may have multiple (e.g., 2) ports, each one connected directly to one of the switches.

Each of the processing nodes 212a-n may, respectively, also include memory portions 214a-n. The memory portion of each processing node may be characterized as locally accessible with respect to that particular processing node, and more specifically with respect to other components on the same processing node. For example, processing node 212a includes memory portion 214a which is memory that is local to that particular processing node 212a. Data stored in memory portion 214a may be directly accessed by any of the processing cores 217a (e.g., executing instructions on behalf of one of the directors 216a) of the processing node 212a. For example, memory portion 214a may be a fast memory (e.g., DIMM (dual inline memory module) DRAM (dynamic random access memory)) that is locally accessible by a director 216a, where data from one location in 214a may be copied to another location in 214a directly using DMA operations (e.g., local memory copy operations) issued by director 216a. Thus, the director 216a may directly access data of 214a locally without communicating over the fabric 230.

The memory portions 214a-214n of processing nodes 212a-n may be further partitioned into different portions or segments for different uses. For example, each of the memory portions 214a-214n may respectively include GM segments 220a-n configured for collective use as segments of a distributed GM, for example, GM 225 (e.g., GM 25b). Thus, data stored in any GM segment 220a-n may be accessed by any director 216a-n on any processing node 212a-n. Additionally, each of the memory portions 214a-n may respectively include dedicated local memories 222a-n. Each of the dedicated local memories 222a-n are respectively configured for use locally by the one or more directors 216a-n, and possibly other components, residing on the same single processing node. In at least one embodiment where there is a single director denoted by 216a (and generally by each of 216a-n), data stored in the dedicated local memory 222a may be accessed by the respective single director 216a located on the same processing node 212a. However, the remaining directors located on other ones of the N processing nodes may not access data stored in the dedicated local memory 222a.

To further illustrate, GM segment 220a may include information such as user data stored in the cache portion 220a, metadata, and the like, that is accessed (e.g., for read and/or write) generally by any director of any of the processing nodes 212a-n. Thus, for example, any director 216a-n of any of the processing nodes 212a-n may communicate over the fabric 230 to access data in GM segment 220a. In a similar manner, any director 216a-n of any of the processing nodes 212a-n may generally communicate over fabric 230 to access any GM segment 220a-n of the distributed GM. Although a particular GM segment, such as 220a, may be locally accessible to directors on one particular processing node, such as 212a, any director of any of the processing nodes 212a-n may generally access the GM segment 220a. Additionally, the director 216a also may use the fabric 230 for data transfers to and/or from GM segment 220a even though 220a is locally accessible to director 216a (without having to use the fabric 230).

Also, to further illustrate, dedicated local memory 222a may be a segment of the memory portion 214a on processing node 212a configured for local use solely by components on the single/same processing node 212a. For example, dedicated local memory 222a may include data described in following paragraphs which is used and accessed only by directors 216a included on the same processing node 212a as the dedicated local memory 222a. In at least one embodiment in accordance with techniques herein and as described elsewhere herein, each of the dedicated local memories 222a-n may include a local page table or page directory used, respectively, by only director(s) 216a-n local to each of the processing nodes 212a-n.

In such an embodiment as in FIG. 2, the GM segments 220a-n may be logically concatenated or viewed in the aggregate as forming one contiguous GM logical address space of a distributed GM. In at least one embodiment, the distributed GM formed by GM segments 220a-n may include the cache portion 254a, various metadata and/or structures, and other information, as described in more detail elsewhere herein. Consistent with discussion herein, the cache portion 254a, having cache slots allocated from GM segments 220a-n, may be used to store I/O data (e.g., for servicing read and write operations).

Each cache portion 254a-n may be a portion of a shared cache 228 (e.g., cache 28) distributed across the processing nodes 212a-n, where the shared cache 228 may be considered a part of the GM 225. The cache portion 254a-n may include a plurality of cache slots 256a-n, each cache slot including one or more (e.g., 16) sections 258a-n. Each cache slot 256a-n may be of a uniform size (e.g., 128 KB) and each section may be of a uniform size (e.g., 8 KB). It should be appreciated that cache slot sizes and section sizes other than 128 KB and 8 KB, and a quantity of sections other than 16, may be used.

In an embodiment, the storage system as described may be characterized as having one or more logical mapping layers in which an LSU of the storage system is exposed to the host whereby the LSU is mapped by such mapping layers of the storage system to one or more physical storage devices. Additionally, the host also may have one or more additional mapping layers so that, for example, a host-side LSU may be mapped to one or more storage system LSUs as presented to the host.

Any of a variety of data structures may be used to process I/O on storage system 20a, including data structures to manage the mapping of LSUs and locations thereon to physical storage devices and locations thereon. Such data structures may be stored in any of memory 26, including GM 25b and memory 25a, GM segment 220a-n and/or dedicated local memories 22a-n. Thus, storage system 20a, and storage system 620a described in more detail elsewhere herein, may include memory elements (e.g., cache) that hold data stored on physical storage devices or that is currently held ("staged") and will be stored ("de-staged") to physical storage devices, and memory elements that store metadata (e.g., any of the metadata described herein) associated with such data. Illustrative examples of data structures for holding such metadata will now be described.

Figure 3:
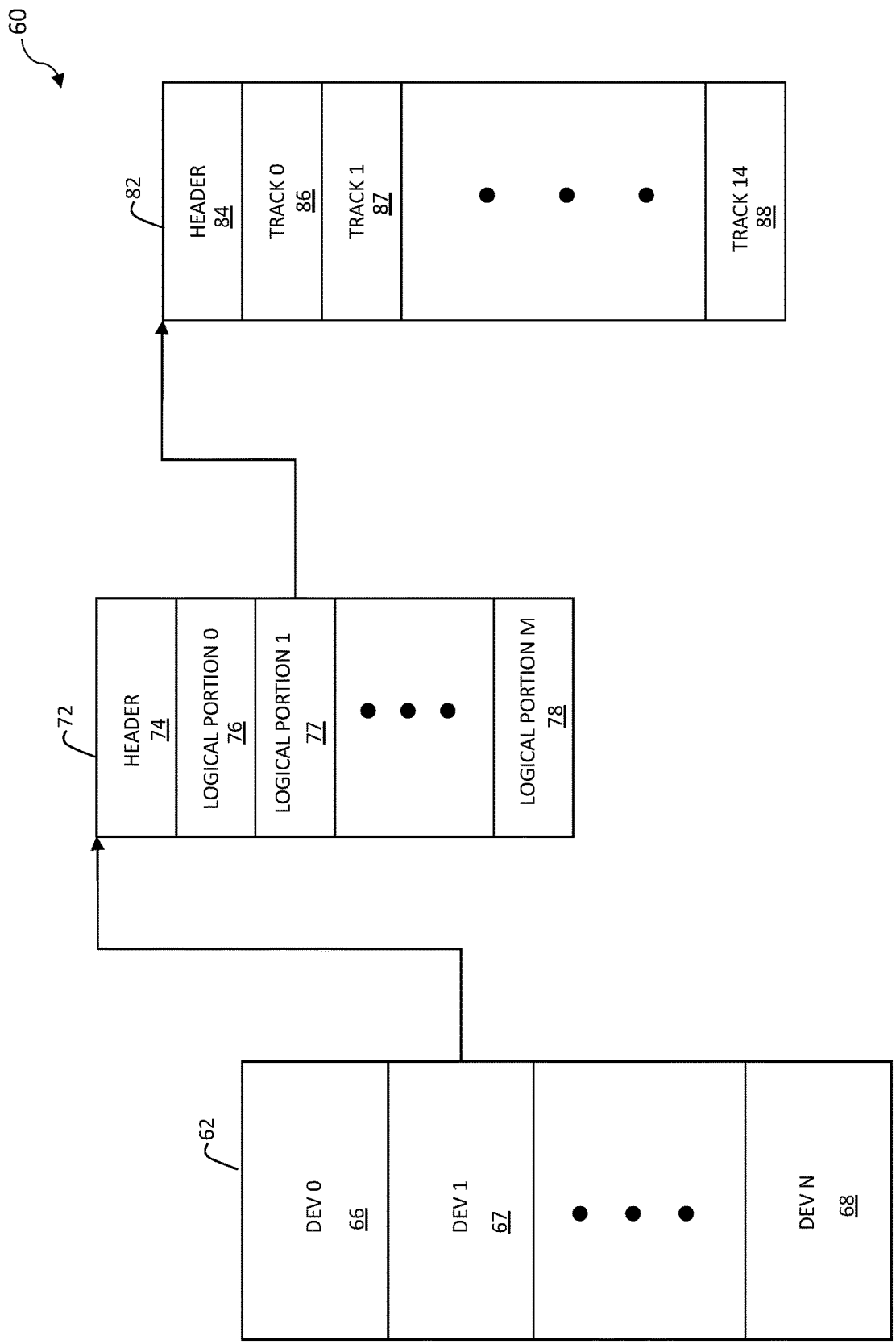
FIG. 3 is a block diagram illustrating an example of tables defining relationships between logical storage units and physical storage devices on a data storage system, according to embodiments of the invention.

FIG. 3 is a block diagram illustrating an example of tables 60 defining relationships between LSUs and physical storage devices on a data storage system, according to embodiments of the invention. A first table 62 corresponds to the LSUs (e.g., logical deices) used by a storage system (e.g., storage system 20a) or by an element of a storage system, such as an FA and/or a BE, and may be referred to herein as a "master LSU table." The master LSU table 62 may include a plurality of LSU entries 66-68, each entry representing an LSU used by the storage system. The entries in the master LSU table 62 may include descriptions for any type of LSU described herein.

Each of the entries 66-68 of the master LSU table 62 may correspond to, and include a reference to, another table corresponding to the LSU represented by the respective entry. For example, the entry 67 may reference a table 72, referred to herein as an "LSU table," corresponding to the LSU represented by the entry 67. The LSU table 72 may include a header that contains information pertinent to the LSU as a whole. The LSU table 72 also may include entries 76-78 for separate contiguous logical data portions of the represented LSU; each such logical data portion corresponding to, and including a reference to, one or more contiguous physical locations (e.g., logical block address ranges) of a physical storage device (e.g., a cylinder and/or a group of tracks). In an embodiment disclosed herein, an LSU may contain any number of logical data portions depending upon how the LSU is initialized. However, in other embodiments, an LSU may contain a fixed number of logical data portions.

Each of the logical data portion entries 76-78 may correspond to a track table. For example, the entry 77 may correspond to a track table (or "LSU track table") 82, which includes a header 84. The LSU track table 82 also includes entries 86-88, each entry representing an LSU track of the entry 77. As used herein, a "track" or "LSU track" represents a contiguous segment of physical storage space on a physical storage device. In an embodiment disclosed herein, there are fifteen tracks for each contiguous logical data portion. However, for other embodiments, it may be possible to have different numbers of tracks for each of the logical data portions or even a variable number of tracks for each logical data portion. The information in each of the LSU track entries 86-88 may include a pointer (either direct or indirect—e.g., through another data structure) to a physical address of a physical storage device, for example, any of physical storage devices 24 of the storage system 20a (or a remote storage system if the system is so configured).

In addition to physical storage device addresses, or as an alternative thereto, each of the LSU track entries 86-88 may include a pointer (either direct or indirect—e.g., through another data structure) to one or more cache slots of a cache in the GM if the data of the logical track is currently in cache. For example, an LSU track entry 86-88 may point to one or more entries of cache slot table 300, described in more detail elsewhere herein. Thus, the LSU track table 82 may be used to map logical addresses of an LSU corresponding to the tables 62, 72, 82 to physical addresses within physical storage devices of a storage system and/or to cache slots within a cache. In some embodiments, each entry 86-88 may specify a version of the data stored on the track. A sub-element of an LSU, for example, a logical storage portion or track, may be referred to herein as a logical storage element (LSE).

FIG. 4 is a diagram illustrating an example of a table 72' used for a thin logical device (i.e., a thin LSU), which may include null pointers as well as entries similar to entries for the LSU table 72, discussed above, that point to a plurality of LSU track tables 82a-82e. Table 72' may be referred to herein as a "thin device table." A thin logical device may be allocated by the system to show a particular storage capacity while having a smaller amount of physical storage that is actually allocated. When a thin logical device is initialized, all (or at least most) of the entries in the thin device table 72' may be set to null. Physical data may be allocated for particular sections as data is written to the particular logical data portion. If no data is written to a logical data portion, the corresponding entry in the thin device table 72' for the data portion maintains the null pointer that was written at initialization.

FIG. 5 is a block diagram illustrating an example of a data structure 300 for mapping LSU tracks (e.g., thin device tracks) to cache slots of a cache. Data structure 300 may be referred to herein as a "cache slot table." The cache slot table 300 may include a plurality of entries (i.e., rows) 302, each row representing an LSU track (e.g., any of LSU tracks 86-88 in track table 82) identified by an LSU ID in column 304 and an LSU track ID (e.g., number) identified in column 306. For each entry of the cache slot table 300, a column 312 may specify (e.g., using a cache slot ID and/or memory address) a cache location in a cache corresponding to the logical storage device track specified by columns 304 and 306. A combination of an LSU identifier and LSU track identifier may be used to determine from columns 304 and 306 whether the data of the identified LSU track currently resides in any cache slot identified in column 312. Through use of information from any of tables 62, 72, 72' and 82 described in more detail elsewhere herein, the one or more LSU tracks of an LSU specified in an I/O operation can be mapped to one or more cache slots. Further, using the same data structures, the one or more physical address ranges corresponding to the one or more LSU tracks of the LSU may be mapped to one or more cache slots.

Each of the entries 302 of the cache slot table also may specify: cache lock information in a column 314, replication information in a column 316, and other cache information in a column 318. The cache lock information may indicate whether or not the cache slot represented by the entry is locked, and if locked, the process ID of the entity that owns the lock. The entity may be, for example: an FA executing a write operation from a host; an RA replicating a write operation from the cache slot to R2, or replicating a write operation from R2 into the cache slot; or a BE de-staging data in the cache to a physical storage device or reading data from a PSD into the cache slot. The replication information may specify information relative to replication, for example, the replication cycle number currently associated with the cache slot, the replication (e.g., RDF) group associated with the cache slot (i.e., associated with the R1 track currently mapped to the cache slot, a type of cache slot (e.g., normal or duplicate), and other information. A normal cache slot type may indicate that a cache slot is handled per normal processing, i.e., when there is not a cache lock conflict resolution involved, for example, as described herein. A duplicate cache slot type may indicate that a cache slot is a duplicate of a cache slot used to resolve a cache slot lock conflict, which is not handled in the standard manner, but rather, is handled differently to resolve the cache slot lock, for example, as described herein.

The other cache slot information in the column 318 may include information about the status of writes to one or more portions (e.g., sectors) of the R1 track corresponding to the cache slot, e.g., whether the write is pending or complete. Completing the write may include writing it to a PSD on S1 (e.g., de-staging it from cache) and receiving acknowledgement from S2 (and perhaps other remote storage systems to which the LSU in question is being replicated) that the replicated data is committed on S2 (and other remote storage systems if any).

It should be appreciated that the cache slot table 300 may be used for purposes independent of any LSU tracks mapped thereto. That is, a cache slot ID or memory address in cache pointer column 312 may be used as a key to access, and modify as necessary, cache metadata about a cache slot, including any of the information in columns 314, 316 and/or 318.

The tables 62, 72, 72', 82 and 300 may be stored in the GM 26 of the storage system 20a during operation thereof and may otherwise be stored in non-volatile memory (i.e., with the corresponding physical storage device). In addition, tables corresponding to LSUs accessed by a particular host may be stored in local memory of the corresponding one of the FAs 21a-n. In addition, RA 40 and/or the BEs 23a-n also may use and locally store portions of the tables 62, 72, 72', 82 and 300. Other data structures may be stored in any of GM 25b, memory 25a, GM segment 220a-n and/or dedicated local memories 22a-n.

Any of the information contained in any of the data structures 62, 72, 72', 82 and 300, for example, the information included in the LSU track table 82 and the cache slot table 300, may be combined in a single data structure, which may be referred to herein as an LSU track metadata table. In some embodiments, a cache slot table 300 may be maintained separately from an LSU track metadata table. In such embodiments, the entries 302 of the cache slot table 300 may be indexed/keyed by a cache slot ID and/or memory address in the column 312, may identify the LSU track currently mapped to the slot (if any) in columns 304 and 306, may include cache lock info in the column 314, and may include other cache info. In such embodiments, the LSU track table may include: information about the LSU track described in relation to the LSU track table 82; replication information described in relation to the column 316; the cache slot (of any) currently mapped to the LSU track; and any other information described in relation to the cache slot table 300.

In some embodiments of the invention, data replication may be employed between two or more storage systems on a storage network, which may before referred to herein as "remote data replication" to distinguish it from "local data replication," which may be used herein to refer to data replication performed within a single storage system. Referring back to FIG. 1, the RA (remote adapter) 40 may be configured to facilitate communication between data storage systems, such as between two of the same or different types of data storage systems. In one embodiment described in more detail in following paragraphs and figures, the RAs of the different data storage systems may communicate over a Gigabit Ethernet or Fibre Channel transmission channel supporting messaging traffic between data storage systems. The RA (e.g., RA 40) may include hardware including a processor used to facilitate communication between data storage systems, such as between two data storage systems. The RA may be used with the Dell EMC™ Symmetrix® Remote Data Facility (SRDF®) products. Dell EMC™ SRDF® is a family of products that facilitates the data replication from one data storage array to another through a Storage Area Network (SAN) or and IP network. Dell EMC™ SRDF® logically pairs a device or a group of devices from each array and replicates data from one to the other synchronously or asynchronously. Generally, the Dell EMC™ SRDF® products are one example of commercially available products that may be used to provide functionality of a remote data facility (RDF) for use in an embodiment in connection with techniques herein.

Figure 6:
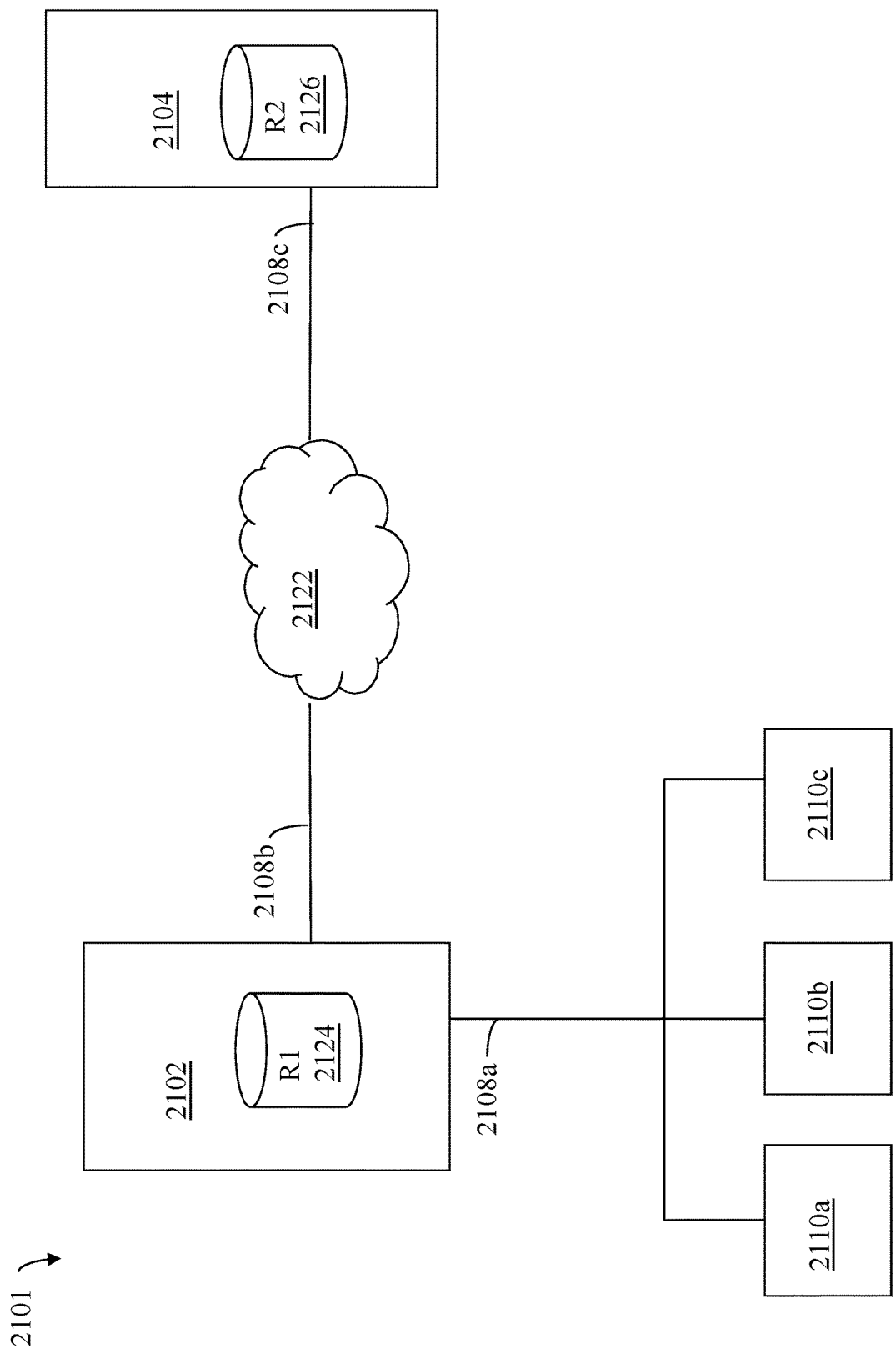
FIG. 6 is a block diagram illustrating an example of components configured for replication, according to embodiments of the invention.

Referring to FIG. 6, shown is an example of an embodiment of a system 2101 that may be used in connection with the techniques described herein. It should be noted that the embodiment illustrated in FIG. 6 presents a simplified view of some of the components illustrated in FIG. 1, for example, including only some detail of the data storage system 20a for the sake of illustration.

Included in the system 2101 are data storage systems 2102 and 2104 and hosts 2110a, 2110b and 1210c. The data storage systems 2102, 2104 may be remotely connected and communicate over network 2122, such as the Internet or other private network, and facilitate communications with the components connected thereto. Hosts 2110a, 2110b and 2110c may perform operations to data storage system 2102 over connection 2108a. The hosts 2110a, 2110b and 2110c may be connected to the data storage system 2102 through connection 2108a which may be, for example, network or other type of communication connection. Although not illustrated, the hosts 2110a-2110c also may be directly connected to a network such as the Internet.

The data storage systems 2102 and 2104 may include one or more LSUs (e.g., logical storage devices). In this example, data storage system 2102 includes LSU R1 2124 and data storage system 104 includes LSU R2 2126. Both of the data storage systems may include one or more other logical and/or physical devices. Data storage system 2102 may be characterized as local with respect to hosts 2110a, 2110b and 2110c. Data storage system 104 may be characterized as remote with respect to hosts 2110a, 2110b and 2110c. The R1 and R2 LSUs may be configured as LUNs.

The host 2110a may issue a command, such as to write data to LSU R1 of data storage system 2102. In some instances, it may be desirable to copy data from the LSU R1 to another second LSU, such as R2, provided in a different location so that if a disaster occurs that renders R1 inoperable, the host (or another host) may resume operation using the data of R2. Such a capability is provided, for example, by the Dell EMC™ SRDF® products. Communication between LSUs on different data storage systems using Dell EMC™ SRDF® is described, for example, in U.S. Pat. Nos. 5,742,792, 5,544,347, and 7,054,883, all of which are incorporated by reference herein. With Dell EMC™ SRDF®, a user may denote a first LSU, such as R1, as a master LSU and a second LSU, such as R2, as a slave LSU. Other incarnations of Dell EMC™ SRDF® may provide a peer to peer relationship between the local and remote LSUs. In this example, the host 2110a interacts directly with the LSU R1 of data storage system 2102, but any data changes made are automatically provided to the R2 LSU of data storage system 2104 using Dell EMC™ SRDF®. In operation, the host 2110a may read and write data using the R1 volume in 2102, and Dell EMC™ SRDF® may handle the automatic copying and updating of data from R1 to R2 in data storage system 2104.

As illustrated in connection with other figures herein, data storage system 2102 may have one or more RAs included therein to facilitate remote connections to the data storage system 2104. Communications between storage system 2102 and 2104 may be made over connections 2108b, 2108c to network 2122. Data storage system 2104 may include one or more RAs for use in receiving the communications from the data storage system 2102. The data storage systems may communicate, for example, over Gigabit Ethernet connections supporting TCP/IP traffic. The Dell EMC™ SRDF® replication functionality may be facilitated with the RAs provided at each of the data storage systems 2102 and 2104. Performing remote data communications using SRDF® over a TCP/IP network is described in more detail in U.S. Pat. No. 6,968,369, Nov. 22, 2005, Veprinsky, et al., "Remote Data Facility Over an IP Network," which is incorporated by reference herein. In connection with Dell EMC™ SRDF®, a single RDF link, connection or path may be between an RA of the system 2102 and an RA of the system 2104. As described in more detail below, techniques are described for use in transmitting data over an RDF link, such as I/O traffic including write data in connection with performing remote data replication over the RDF link between the systems 2102 and 2104.

An embodiment also may include the concept of a remote data facility (RDF) group in which one or more LSUs (e.g., LUNs) on a data storage system are associated with a particular group under the control of a single RA which services the LSUs included therein. Rather than have a single R1 LSU and a single R2 LSU, a grouping may be defined so that a source group of LSUs, such as on data storage system 2102, have corresponding target LSUs of a target group, such as LSUs on data storage system 2104. Devices in a source group may be mirrored in corresponding LSUs of a target group using Dell EMC™ SRDF® functionality.

Techniques herein may be used with Dell EMC™ SRDF®, or more generally any RDF, operating in one or more different supported modes. For example, such modes may include Dell EMC™ SRDF® operating in synchronous mode, asynchronous mode, or adaptive copy mode. For example, in connection with Dell EMC™ SRDF®, the host may issue a write to an R1 LSU in a first data storage system and the data change is propagated to the R2 LSU in a second data storage system. As discussed in U.S. Pat. No. 5,544,347, Dell EMC™ SRDF® can be operated in either a synchronous mode or an asynchronous mode. When operating in the synchronous mode, the host does not consider a write I/O operation to be complete until the write I/O has been completed on both the first and second data storage systems. Thus, in synchronous mode, the first or source storage system will not provide an indication to the host that the write operation is committed or complete until the first storage system receives an acknowledgement from the second data storage system regarding completion or commitment of the write by the second data storage system. In contrast, in connection with the asynchronous mode, the host receives an acknowledgement from the first data storage system as soon as the information is committed to the first data storage system without waiting for an acknowledgement from the second data storage system.

Depending on the physical distance between the data storage systems 2102, 2104, it may be desirable to operate in a mode such as asynchronous to avoid host timeouts while the host awaits acknowledgement regarding completion of a host I/O.

Described in following paragraphs are techniques that may be used in connection with performing data replication in a synchronous manner such as Dell EMC™ SRDF® operating in an synchronous mode (Dell EMC™ SRDF®/S). With synchronous mode data replication, a host 2110a may issue a write to the R1 LSU 2124. The primary or R1 data storage system 2102 may store the write data in its cache at a cache location and mark the cache location as including write pending (WP) data as mentioned elsewhere herein. The remote data replication facility operating in synchronous mode, such as Dell EMC™ SRDF®/S, may propagate the write data across an established RDF link (more generally referred to as a the remote replication link or link) such as over 2108b, 2122, and 2108c, to the secondary or R2 data storage system 2104 where the write data may be stored in the cache of the system 2104 at a cache location that is marked as WP. Once the write data is stored in the cache of the system 2104 as described, the R2 data storage system 2104 may return an acknowledgement to the R1 data storage system 2102 that it has received the write data. Responsive to receiving this acknowledgement from the R2 data storage system 2104, the R1 data storage system 2102 may return an acknowledgement to the host 2110a that the write has been received and completed. Thus, generally, R1 LSU 2124 and R2 LSU 2126 may be logical devices, such as LUNs, configured as mirrors of one another. R1 and R2 LSUs may be, for example, fully provisioned LUNs, such as thick (i.e., not thin or virtually provisioned) LUNs, or may be LUNs that are thin or virtually provisioned logical devices.

When operating in asynchronous mode when processing a received write I/O operation from a host as noted above, the primary or R1 data storage system 2102 may store the write data in its cache at a cache location and mark the cache location as including write pending (WP) data as mentioned elsewhere herein. The write data may be propagated across an established RDF link (more generally referred to as a the remote replication link or link) such as over 2108b, 2122, and 2108c, to the secondary or R2 data storage system 2104 where the write data may be stored in the cache of the system 2104 at a cache location that is marked as WP. Once the write data is stored in the cache of the system 2104 as described, the R2 data storage system 2104 may return an acknowledgement to the R1 data storage system 2102 that it has received the write data. With asynchronous mode, once the write data is stored in the cache of the local or R1 system 2102 and marked as WP, an acknowledgement regarding completion of the host write may be sent to the host 2110a by the system 2102. Thus, in asynchronous mode the system 2102 is not required to wait to receive the acknowledgement from the R2 data storage system 2104 prior to sending the acknowledgement to the host regarding completion of the write operation.

Although only a single RDF link 2402 is illustrated in connection with replicating data from systems 2102 to system 2104 in connection with techniques herein, more generally any number of RDF links may be used. Although only a single RDF link 2502 is illustrated in connection with replicating data from systems 2104 to system 2102, more generally any number of RDF links may be used. Furthermore, although 2 RDF links 2402 and 2502 are illustrated, in at least one embodiment, a single RDF link may be used in connection with sending data from system 2102 to 2104, and also from 2104 to 2102.

In at least one embodiment in accordance with techniques herein, the FC protocol may be used in connection with communications (e.g., over the SAN including the RDF links) between the data storage system 2102 and 2104.

Asynchronous remote replication (ARR) may include a plurality of replication cycles for R1, each cycle corresponding to a period of time and specifying any R1 tracks for which data was updated (e.g., by a write operation) during the period of time represented by the cycle. Each cycle may transition through four phases—two phases on S1 and two phases on S2. The two phases on S1 may include a capture phase during which the data updates for R1 are captured or collected, after which the cycle transitions into a transfer phase during which the updated data for R1 is transmitted from S1 to S2 to be updated for R2. On S2, the cycle begins in a receive phase during which the data updates transmitted as part of the transfer phase on S1 are received on S2, and transitions to an apply phase during which the data updates are applied R2. Replication cycles for remote replication are described in greater detail in U.S. Pat. No. 9,880,946, "Data Transfer Techniques with Data Replication," to Benjamin Yoder et al., issued Jan. 30, 2018 ("Yoder"), the entire content of which is hereby incorporated by reference in its entirety.

FIG. 7A-7D collectively illustrate an example of a system 700 for resolving a cache slot locking conflict, according to embodiments of the invention. Other embodiments of a system for resolving a cache slot locking conflict, for example, variations of the system 700, are possible and are intended to fall within the scope of the invention. The system 700 may be implemented using one or more components of the storage system 20a, and may include variations to those components and functions performed thereby.

The system 700 may be a storage system, S1 (e.g., the storage system 2102), including an LSU, R1 (e.g., the R1 2124), configured for ARR with an LSU, R2 (e.g., the R2 2126), on S2 (e.g., the storage system 2104). The storage system 700 may include any of: one or more FAs, including an FA 704; an R1 track metadata table 702; a cache 706; one or more RAs, including an RA 708; a capture cache queue 710; a transfer cache queue 712; other components; and/or any suitable combination of the foregoing. The R1 track metadata table 702 may be an LSU track metadata table for R1, and may include any information for R1 described herein in relation to LSU track table 82 and/or cache slot table 300.

Figure 7A:
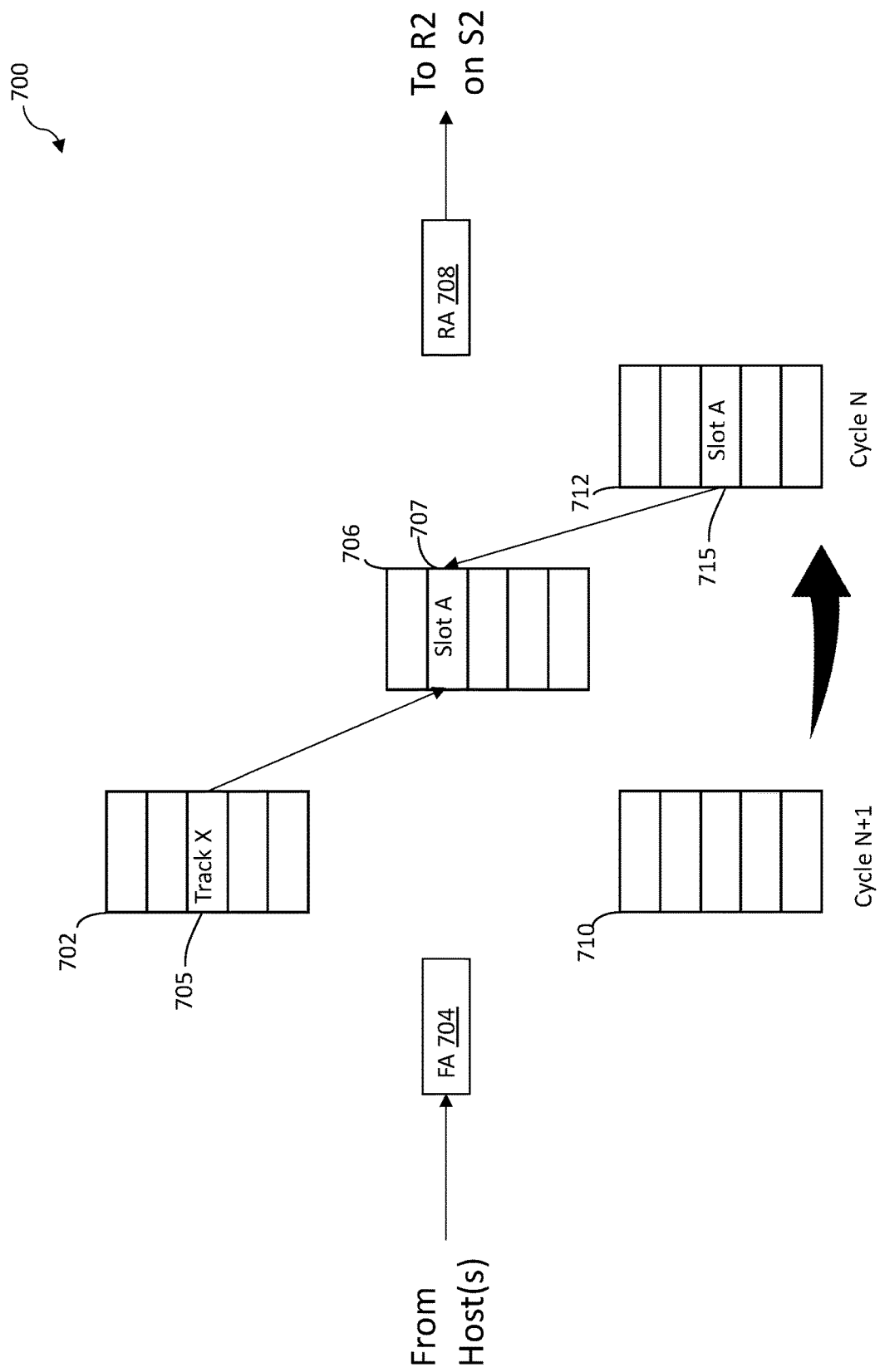
FIG. 7A-7D collectively illustrate an example of a system for resolving a cache slot locking conflict, according to embodiments of the invention.

At a point in time illustrated in FIG. 7A, the R1 track metadata table 702 may include an entry 705 for an R1 track X. The R1 track X is currently mapped to a cache slot A 707 of the cache 706, as specified by a reference (e.g., pointer) in the entry 705 to the cache slot 707. The capture cycle queue 710 includes a plurality of entries for a Cycle N+1 corresponding to a first period of time including the point in time (e.g., a current time) illustrated in FIG. 7A. The Cycle N+1 is in the capture phase of the replication process. Each entry in the capture cycle queue 710 specifies a respective cache slot that is mapped-to by an R1 track for which a write operation was initiated during the first period of time.

The transfer cycle queue 712 includes a plurality of entries for a Cycle N corresponding to a second period of time before (e.g., immediately preceding) the first period of time. The Cycle N is in the transfer phase of the replication process. Each entry in the transfer cycle queue 712 specifies a respective cache slot mapped-to by an R1 track for which a write operation was initiated during the second period. The transfer cycle queue 712 includes an entry 715 specifying the cache slot A 707, meaning that a write operation was initiated for Track X during the second period while Cycle N was in the capture phase. There is currently no lock on the cache slot 707, meaning that no FA is currently in the process of staging a write operation in the cache slot 707 and no RA (including the RA 708) is in the process of transmitting the data of cache slot 707 (including any data updated by the write operation initiated for Track X during the second period) to S2.

FIGS. 7A-7D will be used to illustrate an example of a performance of a method of resolving a cache slot locking conflict in relation to FIG. 8. While not illustrated in FIGS. 7A-7D, the system 700 may include a cache slot table separate from the R1 track metadata table, as described in more detail elsewhere herein. In such embodiments, the cache slot table may specify metadata about the cache slot, including lock information about the cache slot, as described in more details elsewhere herein. Such lock information may include an indication of whether or not there is a lock, and, if there is a lock, the process ID of the process that owns the lock, e.g., a process corresponding to the FA 704 or the RA 708.

FIG. 8 is a flowchart illustrating an example of a method 800 of resolving a cache slot locking conflict, for example, caused by ARR, according to embodiments of the invention. Other embodiments of a method of resolving a cache slot locking conflict, for example, variations of the method 800, are possible and are intended to fall within the scope of the invention.

In a step 802, a write request may be received by an FA (e.g., the FA 704) of a storage system S1 (e.g., 700) from a host system. The write request may specify a write operation for an R1 track (e.g., the Track X). In a step 804, it may be determined, for example, by accessing an R1 track metadata table (e.g., the table 702) that the R1 track is mapped to a first cache slot (e.g., the slot A 707).

In a step 806, it may be determined that the first cache slot is locked by a remote replication process (e.g., a process executed by the RA 708). For example, a transfer cycle (e.g., Cycle N) may include a cache slot (e.g., 715) for which the data of the cache slot is currently in the process of being copied to R2 on S2 as part of ARR. As a result, the FA 704 cannot stage the write operation of the write request 703 in the slot A 707.

Figure 7B:
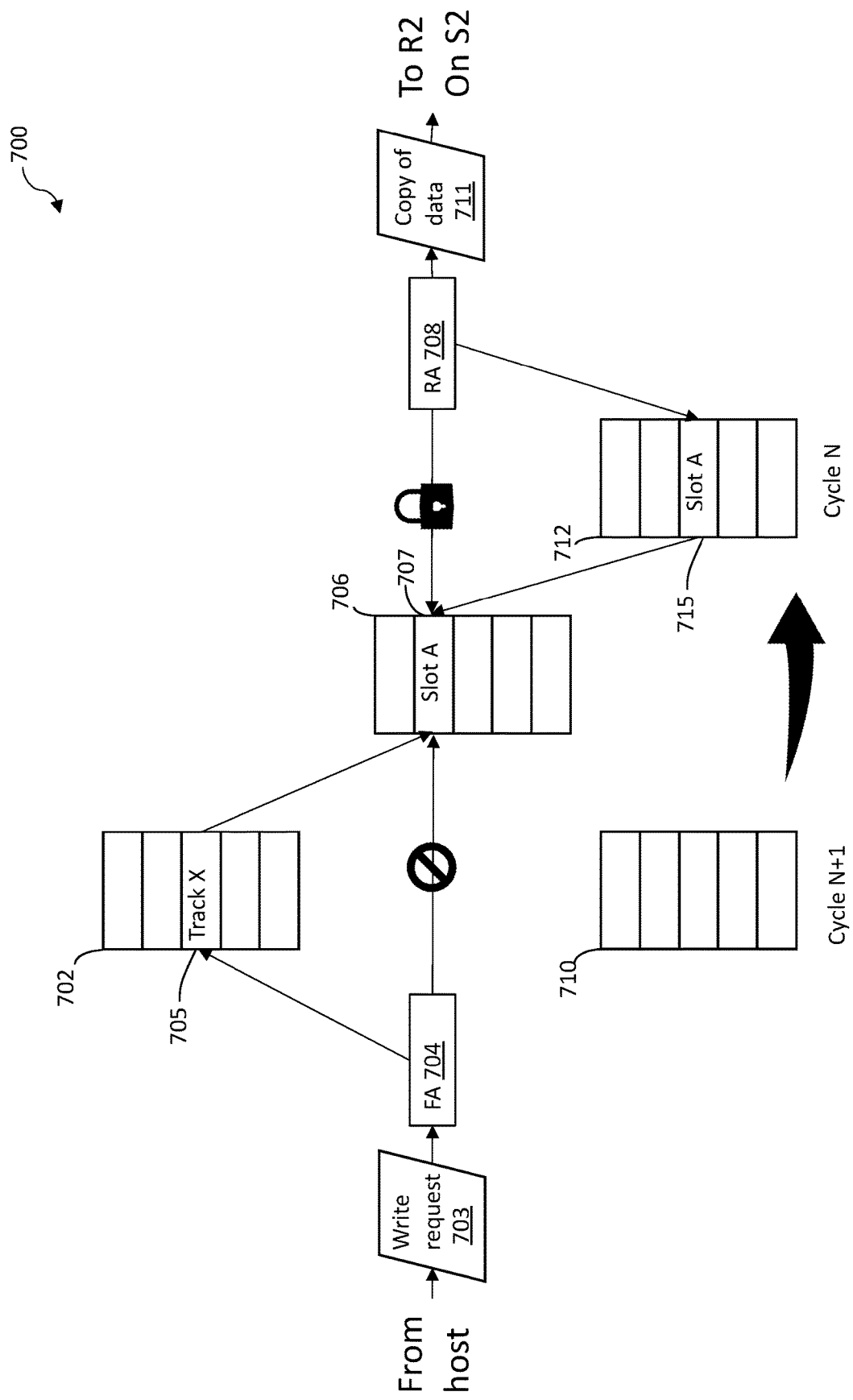

FIG. 7B represents an example of the state of the system 700 following the performance of the steps 802-806. The FA 704 received the write request 703, which specifies a write operation for Track X. The FA 704 learns from accessing the entry 705 of the R1 track metadata table 702 that Track X is mapped to the slot A 707. The RA 708 is currently in the process of transmitting a copy 711 of the data of cache slot A 707 to S2 and has locked the cache slot A 707. The FA 704 learns from accessing one of: the entry 705; cache slot metadata of cache slot table (not shown); and the slot A 707 itself, that the slot A 707 is currently locked by the RA 708.

Returning to the method 800, in a step 808, a request to release the lock of the cache slot may be sent, for example, from the FA 704 to the RA 708. In response to receiving the lock release request, an entity (e.g., RA 708) may initiate performance of steps 810-814. In a step 810, a second cache slot may be allocated for the R1 track mapped to the locked cache slot, and data from the locked cache slot may be copied to the new cache slot in a step 812. In some embodiments, lock information and/or other metadata about the cache slot is stored in the cache slot itself or a cache slot table. In such embodiments, the step 812 may include copying the cache slot metadata, including cache slot lock information, from the original slot or an entry of the cache slot table to the new cache slot.

In a step 814, the R1 track may be re-mapped to the new cache slot, for example, by updating the entry in the R1 track metadata table for the R1 track 1 to point to the new cache slot. Although not illustrated in FIG. 8, the method 800 may include, after the step 814, removing the cache slot lock in the new cache slot (if included therein) or removing the cache slot lock from a cache slot table entry representing the cache slot.

The FA processing the write request received in the step 802 may become aware that the R1 track is now mapped to the new cache slot, for example, by the RA or other entity that performed the step 814 sending a communication to the FA, or by the FA continuing to access the R1 track entry in the R1 track metadata table. In a step 818, the FA may lock the new cache slot, and then initiate the write operation of the write request by staging the write operation in the new cache slot in a step 818.

Independently, and perhaps currently, to performance of the steps 814-818, the RA may perform steps 819 and 821. In the step 819, the RA may update the metadata for the original cache slot (e.g., the cache slot 707), for example, in the cache slot itself, a cache slot table entry and/or in the R1 track metadata table. Updating the cache slot metadata may include changing the cache slot type from normal to duplicate, as the cache 707 is no longer a normal cache slot subject to normal process, but rather is a duplicate cache slot no longer mapped-to Track X entry 705. Updating the metadata further may include clearing any local write pendings associated with any segments of the R1 track, as such local writes will be overridden by the data in the new cache slot when de-staged.

In the step 821, the RA may continue to transmit a copy of the data from the original cache slot to the remote storage system, S2.

Figure 7C:
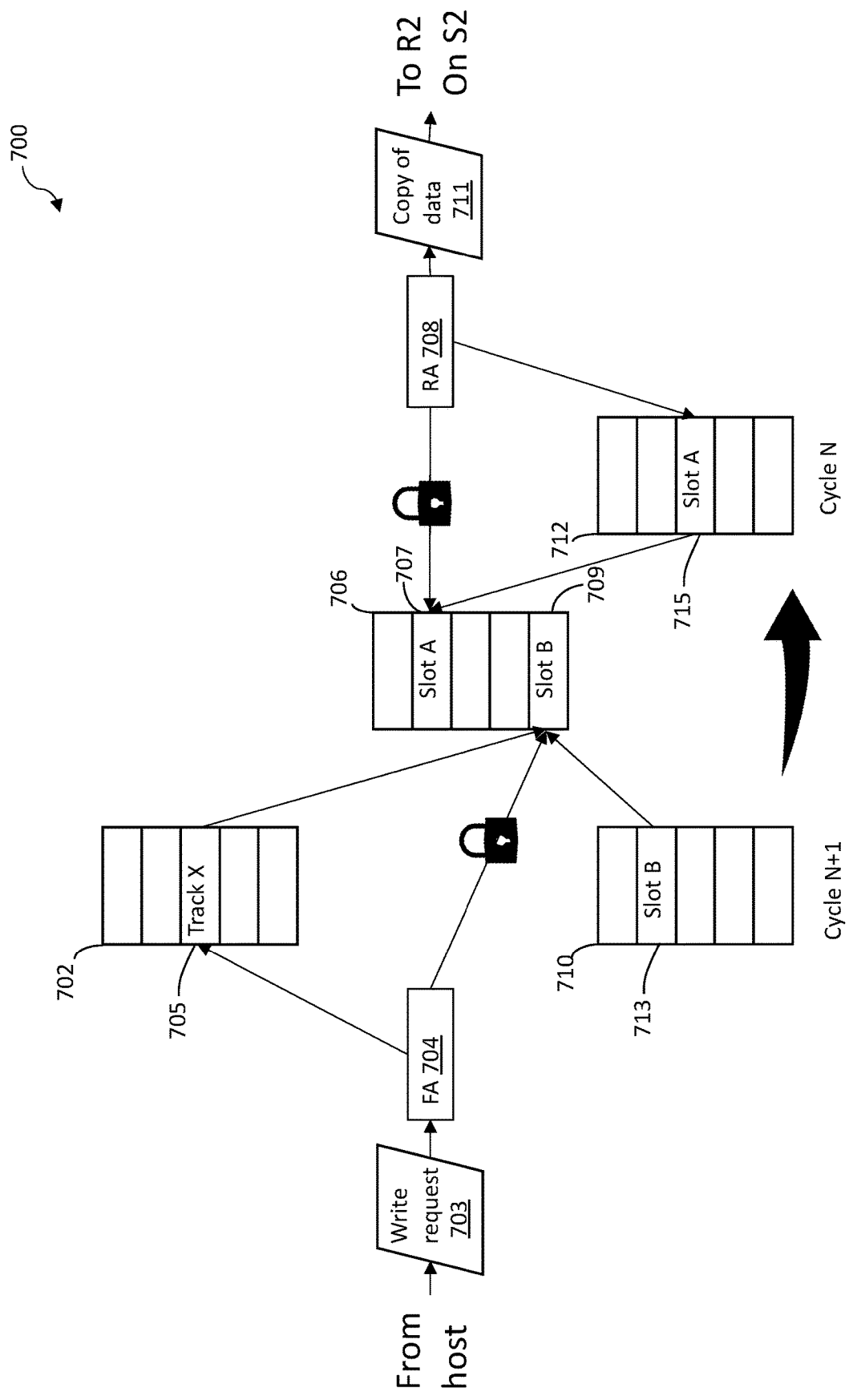

FIG. 7C represents an example of the state of the system 700 following the performance of the steps 812-818 and the step 821. The RA 708, in response to receiving from the FA 704, sends a request (not shown) to release the lock on the cache slot 709, allocates a cache slot B 709 for Track X, and copies data from the locked cache slot A 707 to the new cache slot B 709. The copied data may include the cache slot lock, or the cache slot lock may be copied as part of cache slot metadata as described above. The RA 708 then re-maps Track X to the new cache slot 709 by modifying the entry 705 of the R1 track metadata table 702 to point to the new cache slot 709. The RA 708 also removes the cache slot lock in the new cache slot (if included therein) or from cache slot table metadata (e.g., in a cache slot table entry) representing the cache slot.

The FA 704 becomes aware that the R1 track is now mapped to the new cache slot 709, for example, by the RA 708 sending a communication to the FA 704, or by the FA 704 continuing to access the entry 705. The FA 704 locks the new cache slot 709, and then initiates the write operation of the write request 703 by staging the write operation thereof in the new cache slot 709. Independently of, and perhaps concurrently to, the re-mapping of track X to the new cache slot and/or the locking of the new cache slot and writing thereto by the FA 704, the FA 708 update the metadata for the original cache slot in the cache slot 707 itself, a cache slot table entry and/or in the R1 track entry 705 of the R1 track metadata table 702, and continues transmitting a copy of the data from the original cache slot 707 to the remote storage system, S2.

Returning to the method 800, after the write operation has been staged to the new cache slot, the FA may release its lock on the new cache slot in an Act 820. Similarly, after the RA that transmits the copy of the data from the original cache slot to S2 receives an acknowledgement that the copy of the data has been committed on S2, the RA may release its lock on the original cache slot.

Figure 7D:
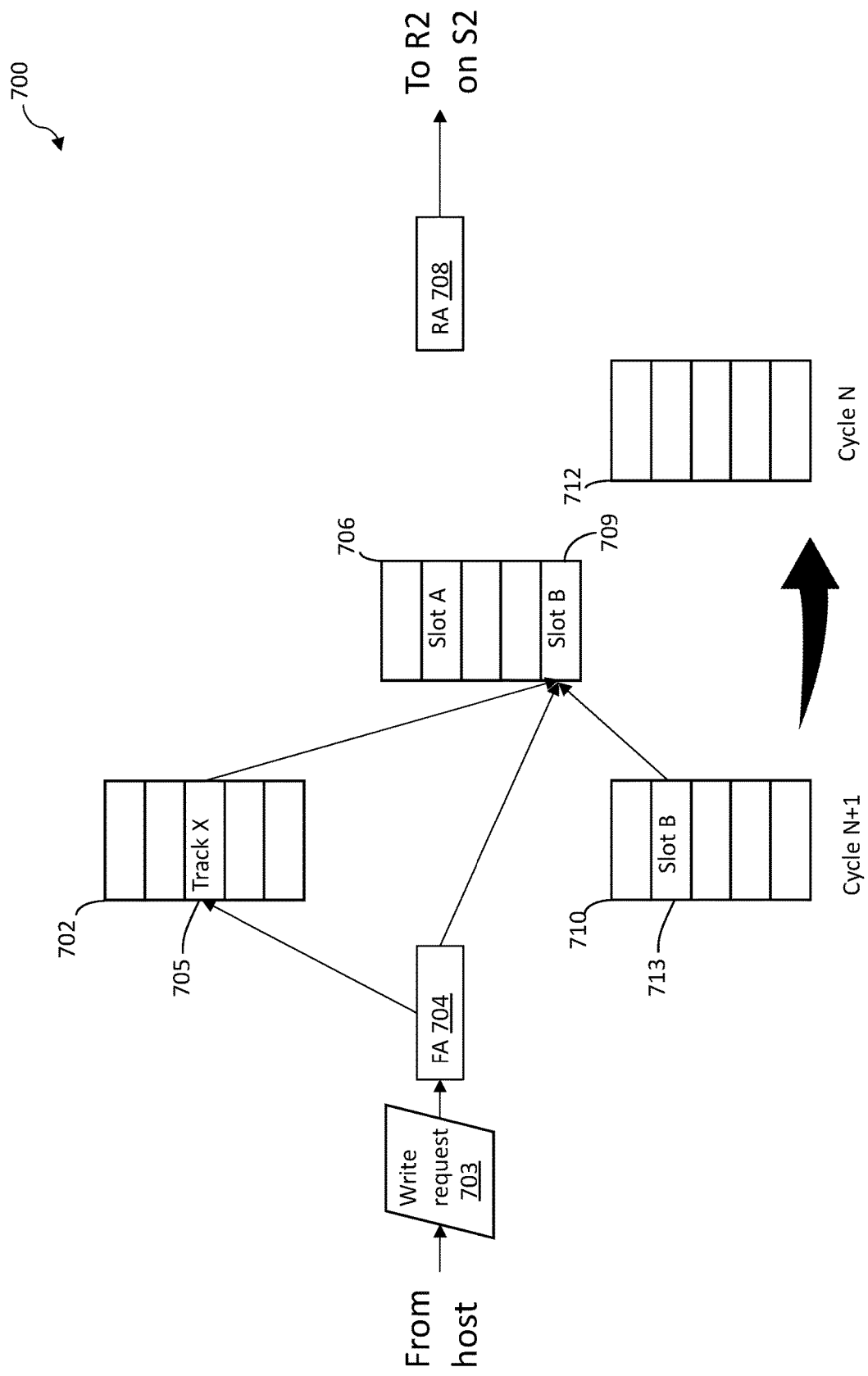

FIG. 7D represents an example of the state of the system 700 following the performance of the steps 820 and 823. After the FA 704 has staged write operation to the new cache slot 709, the FA 704 releases its lock on the new cache slot. Similarly, after the RA 708 receives an acknowledgement that the copy of the data has been committed on S2, the RA releases its lock on the cache slot 707.

Figure 9:
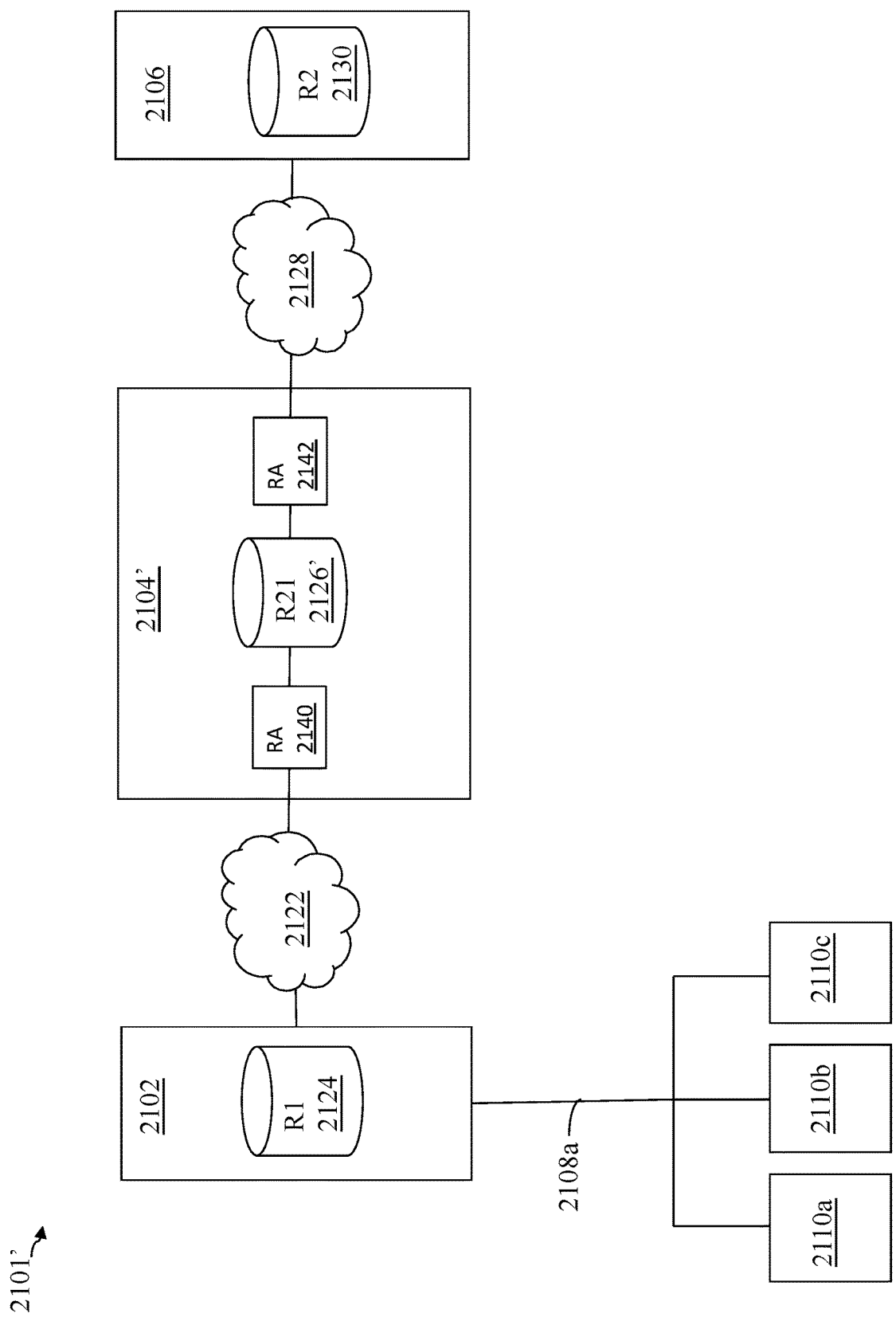
FIG. 9 is a block diagram illustrating an example of a system for implementing remote replication using three storage systems, according to embodiments of the invention.

FIG. 9 is a block diagram illustrating an example of a system 2101' for implementing remote replication using three storage systems, according to embodiments of the invention. Other embodiments of a system for implementing remote replication using three storage systems, for example, variations of the system 2101', are possible and are intended to fall within the scope of the invention. The system 2101' is a variation of the system 2101 and includes the same or similar components as the system 2101 described in relation to FIG. 6. Elements in the system 2101' that are the same as elements in the system 2101 have the same reference numbers and may provide the same functionality, and may not be described again in the following paragraphs in relation to system 2101'.

The system 2101' may include three storage systems 2102, 2104' and 2106, which include LSU R1 2124, LSU R21 2126' and LSU R2 2130, respectively. The data storage systems 2102 and 2104' may be configured to synchronously replicate data from R1 2102 to R21 2126', and the storage systems 2104' and 2106 may be configured to asynchronously replicate the R1 2124 data from R21 2126' to R2 2130, where such an arrangement may be implemented as an SRDF three-site cascade configuration. That is, R21 2126' may serve the role of R2 2126 in system 2101 with respect to R1 2124. However, with respect to R2 2130, R21 may serve a role like R1 2124 with respect to R2 2126 in system 2101.

The storage system 2104' may include an RA 2140 that processes I/O communications between the storage system 2102 as part of implementing synchronous replication between R1 and R21, and an RA 2142 on the storage system 2104' that processes I/O communications between the storage system 2104' and 2106 as part of implementing asynchronous replication between R21 and R2. With respect to processing I/O requests received from the storage system 2102 as part of implementing the synchronous replication of data from R1 2124 to R21 2126', the RA 2140 may serves a role similar to role served by the FA 704 of the system 700 with respect to processing write requests received from host systems. With respect to transmitting data from cache slots of a cache (not shown) on the storage system 2104' to the storage system 2106 as part of implementing a transfer phase of ARR for a cycle, the RA 2142 may serve the same role as the role served by the RA 708 of the system 700 with respect to transmitting data from cache slots of a cache on S1 to S2 as part of implementing a transfer phase of ARR for a cycle.

In some embodiments of the invention, a cache slot locking conflict on the storage system 2104' between the RA 2140 processing replication requests received from the storage system 2102 for replicating R1 2124 data to R21 2126' and the RA 2142 transmitting data from cache slots on the storage system 2104' as part of the transfer phase of ARR between R21 2126' and R2 2130 may be resolved in a manner at least similar to the manner embodied by the method 800. A data replication request may be received by the RA 2140 from the storage system 2102, specifying a track of R1 2124 (e.g., Track Y). It may be determined, for example, by accessing a R1 track metadata table on the storage system 2101' (not shown) that the R1 track is mapped to a first cache slot (Slot S) of a cache on the storage system 2101'.

It may be determined that Slot S is locked by RA 2142. For example, a transfer cycle may include Slot S for which the data of Slot S is currently in the process of being copied to R2 2130 on the storage system 2106 as part of ARR. As a result, the RA 2140 cannot stage the R1 2124 data of the replication request it received in the slot S. A request to release the lock of Slot S may be sent from the RA 2140 to the RA 2142. In response to receiving the lock release request, the RA 2142 may allocate a second cache slot ("Slot T") for Track Y, and data from Slot S may be copied to Slot T. The track Y may be re-mapped to the Slot T, for example, by updating the Slot T entry in the R1 2124 track metadata table to point to the Slot T.

The RA 2140 may become aware that Track Y is now mapped to the new cache slot, for example, by the RA 2142 sending a communication to the RA 2140, or by the RA 2140 continuing to access the Track Y entry in the R1 2124 track metadata table. The RA 2124 may lock the Slot T, stage the R1 2124 data of the replication request in the slot T and unlock the Slot T when the staging is complete. Independently, and perhaps concurrently, to performance of the re-mapping, locking, staging and unlocking, the RA 2142 may update the metadata for Slot S, for example, in the Slot S itself, a cache slot table entry and/or in the Track Y entry in R1 track metadata table, may continue to transmit a copy of the data of Slot S to the storage system 2106, and may unlock the Slot S when it receives an acknowledgement that the copy of the data has been committed on the storage system 2106.

Various embodiments of the invention may be combined with each other in appropriate combinations. Additionally, in some instances, the order of steps in the flowcharts, flow diagrams and/or described flow processing may be modified, where appropriate. It should be appreciated that any of the methods described herein, including method 800, or parts thereof, may be implemented using one or more of the systems and/or data structures described in relation to FIGS. 1-7D and 9, or components thereof. Further, various aspects of the invention may be implemented using software, firmware, hardware, any suitable combination thereof and/or other computer-implemented modules or devices having the described features and performing the described functions. Logic that when executed performs methods described herein, steps thereof or portions of such methods or steps, may be implemented as software, firmware, hardware, or any suitable combination thereof.

Software implementations of embodiments of the invention may include executable code that is stored on one or more computer-readable media and executed by one or more processors. Each of the computer-readable media may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer-readable medium or computer memory on which executable code may be stored and executed by a processor. Embodiments of the invention may be used in connection with any appropriate OS.

As used herein, an element or operation recited in the singular and preceded with the word "a" or "an" should be understood as not excluding plural elements or operations, unless such exclusion is explicitly recited. References to "one" embodiment or implementation of the present disclosure are not intended to be interpreted as excluding the existence of additional embodiments that also incorporate the recited features. Furthermore, a description or recitation in the general form of "at least one of [a], [b] or [c]," or equivalent thereof, should be generally construed to include [a] alone, [b] alone, [c] alone, or any combination of [a], [b] and [c]. In addition, use of a an ordinal term, e.g., "first," "second" or the like, to qualify a term for an item having multiple instances of the same name does not necessarily indicate a priority, precedence or temporal order between the instances unless otherwise indicated, but rather such ordinal terms may be used merely to distinguish between the separate instances.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. For a data storage system including a cache including a plurality of cache slots, a method comprising:
   in response to receiving a write request that specifies first data and a write operation for a first portion of a logical storage unit, determining that the first portion is mapped to a first cache slot of the plurality of cache slots;
   determining that the first cache slot is locked by a remote replication process executing on the storage system;
   responsive to determining that the first cache slot is locked by the remote replication process executing on the storage system, issuing a request to release the first cache slot that is locked; and responsive to receiving the request to release the first cache slot that is locked, performing processing including:
    allocating a second cache slot to the first portion;
    copying second data from the first cache slot to the second cache slot; and
    re-mapping the first portion from the first cache slot to the second cache slot.

2. The method of claim 1, further comprising:
performing the write operation, including staging the first data in the second cache slot.

3. The method of claim 2, further comprising:
after staging the first data in the second cache slot, unlocking the second cache slot.

4. The method of claim 1, further comprising:
transmitting the second data from the first cache slot to a remote storage system.

5. The method of claim 1, wherein the remote replication process executes asynchronous replication.

6. The method of claim 1, wherein a first data structure has a plurality of entries, each entry representing a portion of the logical storage unit, including a first entry representing the first portion, and wherein re-mapping the first portion includes:
    modifying the first entry from pointing to the first cache slot to pointing to the second cache slot.

7. For a data storage system including a cache including a plurality of cache slots, a method comprising:
    in response to receiving a write request that specifies first data and a write operation for a first portion of a logical storage unit, determining that the first portion is mapped to a first cache slot of the plurality of cache slots;
    determining that the first cache slot is locked by a remote replication process executing on the storage system;
    allocating a second cache slot to the first portion;
    copying second data from the first cache slot to the second cache slot; and
    re-mapping the first portion from the first cache slot to the second cache slot, and wherein:
    the remote replication process maintains a plurality of cycles, each cycle corresponding to a respective period of time and including a queue of cache slots,
    a first cycle of the plurality of replication cycles corresponding to a first period of time is in a transfer phase during which data stored in cache slots in the queue of the cache slots of the first cycle are replicated from the storage system to a remote storage system,
    a second cycle of the plurality of replication cycles corresponding to a second period of time, after the first period, wherein during the second cycle the write request is received and the second cycle is in a capture phase during which a queue of cache slots of the second cycle are being populated with cache slots mapped to logical storage unit portions for which write operations were initiated during the second period, and
    wherein the first cache slot is in the first cycle and the second cache slot is in the second cycle.

8. A data storage system comprising:
a cache including a plurality of cache slots; and
executable logic that implements a method comprising:
    in response to receiving a write request that specifies first data and a write operation for a first portion of a logical storage unit, determining that the first portion is mapped to a first cache slot of the plurality of cache slots;
    determining that the first cache slot is locked by a remote replication process executing on the storage system;
    responsive to determining that the first cache slot is locked by the remote replication process executing on the storage system, issuing a request to release the first cache slot that is locked; and
    responsive to receiving the request to release the first cache slot that is locked, performing processing including:
        allocating a second cache slot to the first portion;
        copying second data from the first cache slot to the second cache slot; and
        re-mapping the first portion from the first cache slot to the second cache slot.

9. The data storage system of claim 8, wherein the method further comprises:
performing the write operation, including staging the first data in the second cache slot.

10. The data storage system of claim 9, wherein the method further comprises:
after staging the first data in the second cache slot, unlocking the second cache slot.

11. The data storage system of claim 8, wherein the method further comprises:
transmitting the second data from the first cache slot to a remote storage system.

12. The data storage system of claim 8, wherein the remote replication process executes asynchronous replication.

13. The data storage system of claim 8, wherein a first data structure has a plurality of entries, each entry representing a portion of the logical storage unit, including a first entry representing the first portion, and wherein re-mapping the first portion includes:
    modifying the first entry from pointing to the first cache slot to pointing to the second cache slot.

14. A data storage system comprising:
a cache including a plurality of cache slots; and
executable logic that implements a method comprising:
    in response to receiving a write request that specifies first data and a write operation for a first portion of a logical storage unit, determining that the first portion is mapped to a first cache slot of the plurality of cache slots;
    determining that the first cache slot is locked by a remote replication process executing on the storage system;
    allocating a second cache slot to the first portion;
    copying second data from the first cache slot to the second cache slot; and
    re-mapping the first portion from the first cache slot to the second cache slot, and wherein:
    the remote replication process maintains a plurality of cycles, each cycle corresponding to a respective period of time and including a queue of cache slots,
    a first cycle of the plurality of replication cycles corresponding to a first period of time is in a transfer phase during which data stored in cache slots in the queue of the cache slots of the first cycle are replicated from the storage system to a remote storage system,
    a second cycle of the plurality of replication cycles corresponding to a second period of time, after the first period, wherein during the second cycle the write request is received and the second cycle is in a capture phase during which a queue of cache slots of the second cycle are being populated with cache slots mapped to logical storage unit portions for which write operations were initiated during the second period, and wherein the first cache slot is in the first cycle and the second cache slot is in the second cycle.

15. For a data storage system including a cache including a plurality of cache slots, one or more non-transitory computer-readable media having software stored thereon, the software comprising:

executable code that, in response to receiving a write request that specifies first data and a write operation for a first portion of a logical storage unit, determines that the first portion is mapped to a first cache slot of the plurality of cache slots;

executable code that determines that the first cache slot is locked by a remote replication process executing on the storage system;

executable code that, responsive to determining that the first cache slot is locked by the remote replication process executing on the storage system, issues a request to release the first cache slot that is locked; and executable code that, responsive to receiving the request to release the first cache slot that is locked, performs processing including:
- allocating a second cache slot to the first portion;
- copying second data from the first cache slot to the second cache slot; and
- re-mapping the first portion from the first cache slot to the second cache slot.

16. The one or more non-transitory computer-readable media of claim 15, further comprising:

executable code that performs the write operation, including staging the first data in the second cache slot.

17. The one or more non-transitory computer-readable media of claim 15, further comprising:

executable code that transmits the second data from the first cache slot to a remote storage system.

18. The one or more non-transitory computer-readable media of claim 15, wherein the remote replication process executes asynchronous replication.

19. The one or more non-transitory computer-readable media of claim 15, wherein a first data structure has a plurality of entries, each entry representing a portion of the logical storage unit, including a first entry representing the first portion, and wherein re-mapping the first portion includes:

executable code that modifies the first entry from pointing to the first cache slot to pointing to the second cache slot.

20. For a data storage system including a cache including a plurality of cache slots, one or more non-transitory computer-readable media having software stored thereon, the software comprising:

executable code that, in response to receiving a write request that specifies first data and a write operation for a first portion of a logical storage unit, determines that the first portion is mapped to a first cache slot of the plurality of cache slots;

executable code that determines that the first cache slot is locked by a remote replication process executing on the storage system;

executable code that allocates a second cache slot to the first portion;

executable code that copies second data from the first cache slot to the second cache slot; and executable code that re-maps the first portion from the first cache slot to the second cache slot, and wherein:

the remote replication process maintains a plurality of cycles, each cycle corresponding to a respective period of time and including a queue of cache slots, a first cycle of the plurality of replication cycles corresponding to a first period of time is in a transfer phase during which data stored in cache slots in the queue of the cache slots of the first cycle are replicated from the storage system to a remote storage system, a second cycle of the plurality of replication cycles corresponding to a second period of time, after the first period, wherein during the second cycle the write request is received and the second cycle is in a capture phase during which a queue of cache slots of the second cycle are being populated with cache slots mapped to logical storage unit portions for which write operations were initiated during the second period, and wherein the first cache slot is in the first cycle and the second cache slot is in the second cycle.

* * * * *